(12) United States Patent
Diab et al.

(10) Patent No.: US 7,835,374 B2
(45) Date of Patent: *Nov. 16, 2010

(54) METHOD AND SYSTEM FOR AN ASYMMETRIC PHY OPERATION FOR ETHERNET A/V BRIDGING AND ETHERNET A/V BRIDGING EXTENSIONS

(75) Inventors: Wael William Diab, San Francisco, CA (US); Yong Kim, San Jose, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 11/861,037

(22) Filed: Sep. 25, 2007

(65) Prior Publication Data

US 2008/0285573 A1   Nov. 20, 2008

Related U.S. Application Data

(60) Provisional application No. 60/917,870, filed on May 14, 2007.

(51) Int. Cl.
*H04L 12/56* (2006.01)
(52) U.S. Cl. .......................................... 370/401; 398/71
(58) Field of Classification Search ................. 370/401; 398/71; 389/200; 714/758; 345/204; 348/705
See application file for complete search history.

(56) References Cited

U.S. PATENT DOCUMENTS 7,551,168 B2 *   6/2009   Ahern et al. ................. 345/204
2006/0034295 A1   2/2006   Cherukuri et al.
2007/0014575 A1 *   1/2007   Kramer et al. ................. 398/71
2007/0280239 A1   12/2007   Lund
2008/0031448 A1 *   2/2008   Dang et al. .................. 380/200
2008/0115037 A1 *   5/2008   Effenberger ................. 714/758
2008/0159304 A1 *   7/2008   Ozugur et al. .............. 370/401
2008/0186407 A1 *   8/2008   Miller et al. ................. 348/705

* cited by examiner

*Primary Examiner*—Albert T Chou
(74) *Attorney, Agent, or Firm*—McAndrews, Held & Malloy, Ltd.

(57) ABSTRACT

Signals may be communicated with A/V Bridging services between an upstream link partner and a down stream link partner, each comprising an asymmetric multi-rate Ethernet physical layer (PHY). High bandwidth A/V signals may be transmitted from the upstream link partner and low bandwidth signals may be transmitted from the downstream link partner. One or more of a time stamp, a traffic class and/or a destination address may be utilized in generating PDUs as well as data rate request and a resource reservation messages via the asymmetric Ethernet PHY. The receiving link partner may register for deliver of the PDUs. An aggregate communication rate may be distributed evenly or unevenly among one or more links for transmission and aggregated upon reception via asymmetric multi-rate Ethernet PHY operations. Compressed, uncompressed, encrypted and/or unencrypted signals may be handled. Signal processing may comprise echo cancellation, cross talk cancellation, forward error checking and equalization.

28 Claims, 13 Drawing Sheets

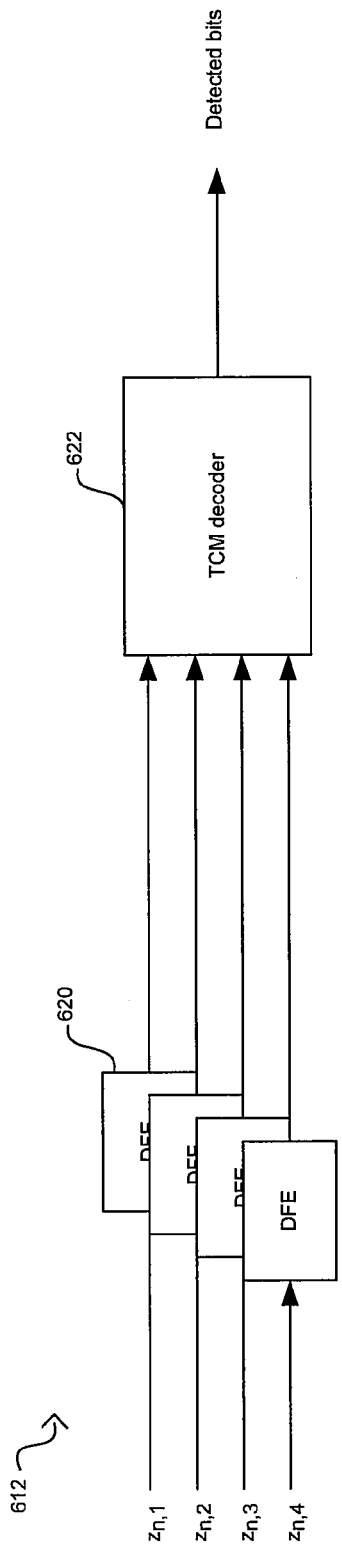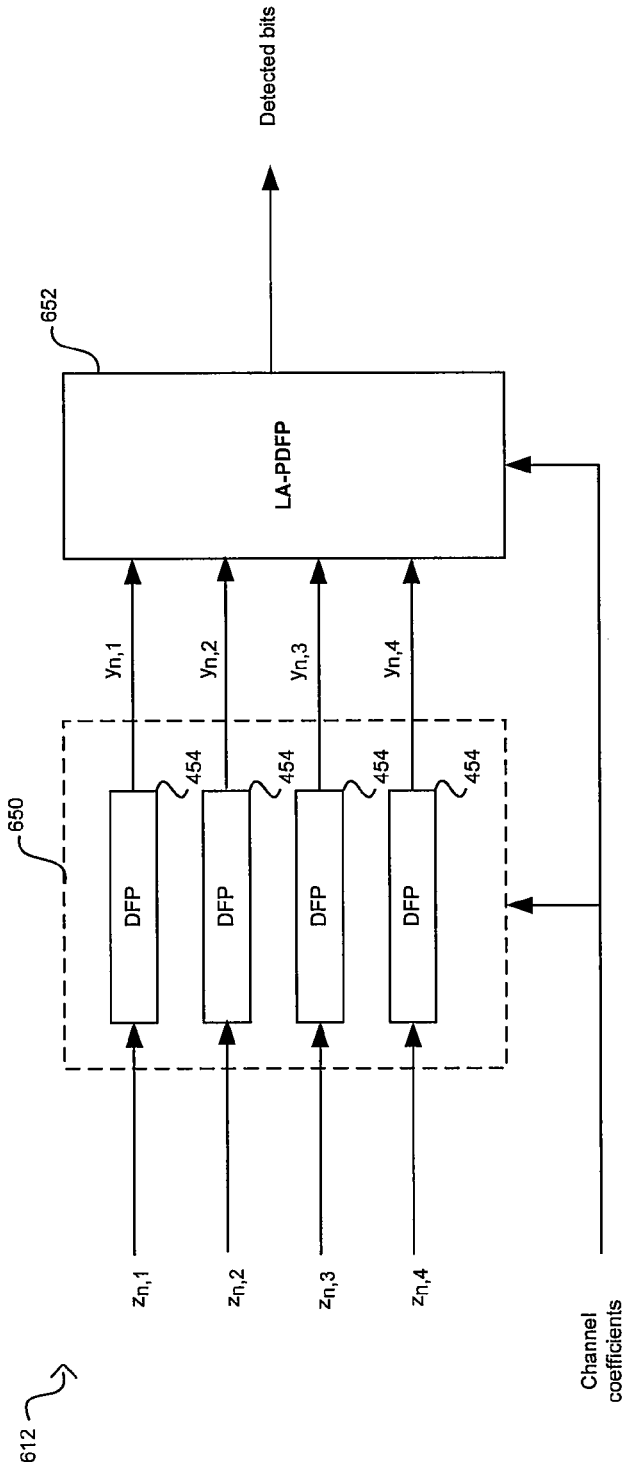
FIG. 6B
FIG. 6C

METHOD AND SYSTEM FOR AN ASYMMETRIC PHY OPERATION FOR ETHERNET A/V BRIDGING AND ETHERNET A/V BRIDGING EXTENSIONS

CROSS-REFERENCE TO RELATED APPLICATIONS/INCORPORATION BY REFERENCE

This application makes reference to and claims priority to U.S. Provisional Application Ser. No. 60/917,870, filed on May 14, 2007, entitled "Method and System for Ethernet Audio/Video Bridging," which is hereby incorporated herein by reference in its entirety.

FIELD OF THE INVENTION

Certain embodiments of the invention relate to high-speed wired communication. More specifically, certain embodiments of the invention relate to a method and system for an asymmetric PHY operation for Ethernet A/V Bridging and Ethernet A/V Bridging extensions.

BACKGROUND OF THE INVENTION

The multimedia consumer electronics market is rapidly evolving with increasingly sophisticated audio/video products. Consumers are becoming accustomed to high definition video in their home entertainment centers as well as high end graphic capabilities on personal computers. Several audio/video interface standards have been developed to link a digital audio/video source, such as a set-top box, DVD player, audio/video receiver, digital camera, game console or personal computer with an audio/video rendering device such as a digital television, a high definition video display panel or computer monitor. Examples of digital video interface technology available for consumer electronics comprise High-Definition Multimedia Interface (HDMI), Display Port, Digital Video Interface (DVI) and Unified Display Interface (UDI) for example. These audio/video interfaces may each comprise unique physical interfaces and communication protocols.

As high data rates are required, new transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

There may be instances where the data rate required for transmission in one direction may be much higher than the data rate required for transmission in the opposite direction, such as the delivery of interactive video from a central office to the consumer, for example. In this regard, the data rate for the transmission of video in one direction may be much higher than the data rate required for transmitting interactive commands in the opposite direction.

A/V Bridging (AVB) comprises a set of specifications, which define service classes (or AVB services) that enable the transport of audio/video (A/V) streams (and/or multimedia streams) across an AVB-enabled network (or AVB network) based on selected quality of service (QoS) descriptors. Specifications, which enable the definition of AVB service classes, include the following.

A specification, which enables a set of AVB-enabled devices (or AVB devices) within an AVB network to exchange timing information. The exchange of timing information enables the devices to synchronize timing to a common system clock, which may be provided by a selected one of the AVB devices within the AVB network.

A specification, which enables an AVB destination device to register a request for delivery of a specified AV stream from an AVB source device. In addition, an AVB source device may request reservation of network resource, which enables the transmission of a specified AV stream. The Stream Reservation Protocol (SRP) defined within the specification provides a mechanism by which the AVB source device may register the request to reserve resources within the AVB network (such as bandwidth) to enable the transmission of the specified AV stream. The Multiple Multicast Registration Protocol (MMRP) may enable an AVB destination device to register the request for delivery of a specified AV stream.

A specification, which defines procedures by which AV streams are transported across the AVB network. These procedures may include methods for the queuing and/or forwarding of the AV streams by individual AVB devices within the AVB network.

A typical AVB network comprises a set of AVB devices, which are collectively referred to as an AVB block. An AVB network may comprise wired local area networks (LANs) and/or wireless LANs (WLANs), for example. Individual AVB devices within the AVB network may include AVB-enabled endpoint computing devices (such as laptop computers and WLAN stations), AVB-enabled switching devices (AV switches) within LANs and AVB-enabled access points (APs) within WLANs, for example. Within the AVB block, AV destination devices may request AV streams from AV source devices, which may be transported across the AVB network within specified latency target values as determined from the QoS descriptors associated with delivery of the AV stream.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for an asymmetric PHY operation for Ethernet A/V Bridging and Ethernet A/V Bridging extensions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transmitting and receiving Audio/Video Bridging (AVB) streams between devices wherein each device may comprise a Media Access Control (MAC) layer supporting AVB services and an asymmetric multi-rate Ethernet physical layer (PHY). The MAC layer functions that support AVB may enable the end-to-end transport of Ethernet frames based on specified latency targets by initiating admission control procedures. The asymmetrical multi-rate Ethernet PHY functions may enable transmission of AVB streams at a first data rate and reception of AVB streams at a second data rate on each of an upstream device and a down stream device. The first data rate may be different from the second data rate. For example, the upstream device may transmit high bandwidth audio, video (A/V) and/or auxiliary data signals at a first data rate and receive lower bandwidth auxiliary data signals at a second data rate that may be a slower standard data rate. Auxiliary data may comprise for example control and/or configuration signals, input from peripheral devices such as keyboards and/or mice, and/or information utilized for security operations such as encryption keys for example. Notwithstanding, the downstream device may transmit the lower bandwidth auxiliary data signals at the first data rate and receive high bandwidth A/V and/or auxiliary signals at the second data rate.

Although AVB services may support video, audio and/or auxiliary data transfers, the invention is not limited in this regard. For example, the AVB services may be utilized to support any latency or bandwidth sensitive data.

In various embodiments of the invention, each of the first data rate and/or the second data rate signals may be apportioned evenly or unevenly among one or more twisted-pair wire in copper cabling Ethernet communication links. In this regard, each of the twisted pair links may support a data rate reduced from the first data rate or a data rate reduced from the second data rate. The reduced communication rates may be achieved by reducing the symbol rate provided to the asymmetric Ethernet multi-rate PHY. The asymmetric Ethernet multi-rate PHY may support signal-processing operations on its high communication rate operations, such as echo cancellation, cross talk cancellation and/or equalization that may be applied to the lower communication rate signals to enable range extension. Reducing the communication rate may enable utilizing cabling with greater insertion loss than those used for a standard connection distance.

Figure 1A:
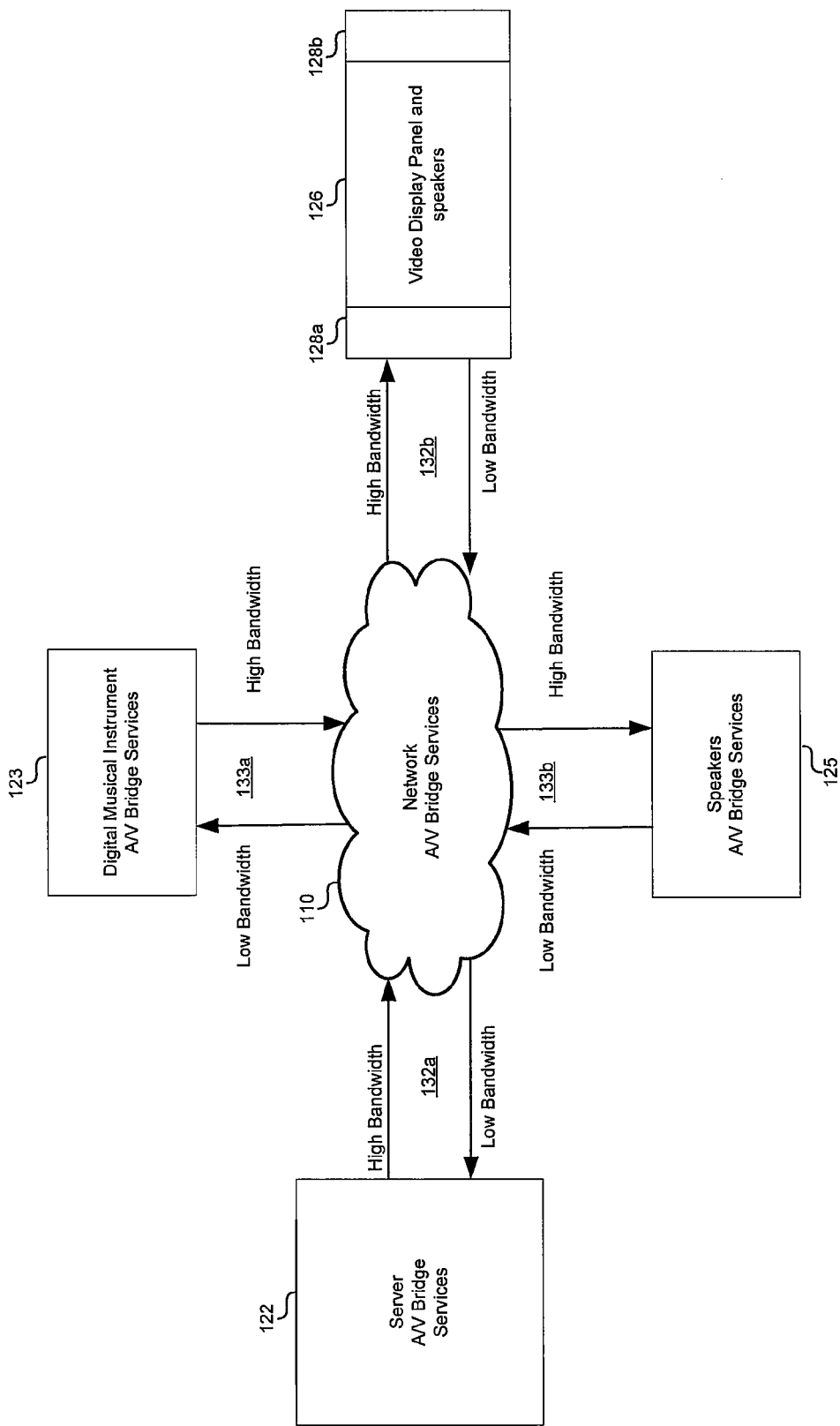
FIG. 1A is a diagram illustrating an exemplary system for transfer of video and/or audio data wherein Audio/Video Bridging (AVB) services may be implemented via an asymmetric multi-rate Ethernet physical layer (PHY) connection, in accordance with an embodiment of the invention.

FIG. 1A is a diagram illustrating an exemplary system for transferring video, audio (A/V) and/or auxiliary data via a network utilizing Audio/Video Bridging (AVB) by a media access control (MAC) layer an asymmetric multi-rate Ethernet physical layer (PHY) connection, in accordance with an embodiment of the invention. Referring to FIG. 1A, there is shown a server 122, a video display panel 126, speakers 128a and 128b, a plurality of Ethernet links 132a and 132b, a network 110, a digital musical instrument 123, speakers 125 and Ethernet links 133a and 133b.

The server 122 may be communicatively coupled with the video display panel 126 and speakers 128a and 128b via the Ethernet links 132a and 132b and the network 110. The server 122 may transfer high bandwidth data, for example, A/V data to the video display panel 126 and speakers 128a and 128b. The server 122 may comprise an Ethernet media access control (MAC) layer for encapsulating data in Ethernet frames and transmission control to the video display panel 126 and speakers 128a and 128b via the Ethernet links 132a, 132b and the network 110. In this regard, the MAC layer may support Audio/Video Bridging (AVB) services wherein end to end quality of service operations may be enabled according to traffic class designations associated with Ethernet frames. In addition, the server 122 may comprise and asymmetric multi-rate Ethernet PHY transceiver. In other embodiments of the invention, the server 122 may be, for example, a personal computer, a DVD player, a video game console and/or an A/V receiver. The invention is not limited to these examples and may comprise any suitable source of data.

The video display panel 126 and speakers 128a and 128b may comprise suitable logic, circuitry and or code to exchange information with the server 122 via the Ethernet connections 132a and 132b and the network 110. Tasks performed by the video display panel 126 and speakers 128a and 128b may comprise reception of Ethernet frames via the Ethernet link 132b, determination that the Ethernet frames may comprise encapsulated A/V content that may be native video or A/V data formatted by a display interface for example HDMI, Display Port or DVI and extraction of the formatted or native A/V content from the Ethernet frames and rendering the A/V content. In this regard, if the A/V data is formatted, the A/V data may comprise instructions for rendering the formatted video data on the video display panel 126 and speakers 128a and 128b, for example. Thus, various embodiments of the invention may enable the video display panel 126 and speakers 128a and 128b to be a "thin client" device that may not comprise high performance hardware and/or software capabilities utilized in the generation of multimedia content for high performance video and/or graphics applications. This in turn may enable the rendering of high performance video and/or graphics on the remote video display panel 126 and speakers 128a and 128b.

In addition, the video display panel 126 and speakers 128a and 128b may comprise an Ethernet MAC layer for encapsulating data in Ethernet frames and for administration of transmissions to and receptions from the server 122 via Ethernet links 132a, 132b and the network 110. In this regard, the MAC layer may support Audio/Video Bridging (AVB) services wherein end to end quality of service operations may be applied according to traffic class designations associated with Ethernet frames. Also, the video display panel 126 and speakers 128a and 128b may comprise an asymmetric multi-rate Ethernet PHY transceiver linked via the network 110 and Ethernet links 132a and 132b. Moreover, the video display panel 126 and speakers 128a and 128b may comprise suitable logic, circuitry and or code to process received A/V and/or auxiliary data from the server 122 for rendering.

The video display panel 126 and speakers 128a and 128b may comprise suitable logic circuitry, and/or code that may enable exchanging A/V and or auxiliary data with the server 122 via a Ethernet links 132a, 132b and the network 110 as well as rendering the A/V content. In this regard, the received data may comprise instructions and/or control information that be utilized for the rendering processes.

The Ethernet links 132a, 132b, 133a and 133b may comprise suitable logic, circuitry and/or code to support asymmetric multi-rate Ethernet PHY operations. Exemplary Ethernet links may comprise category 5 category 5e, category 6, category 6a, category 7 or better cabling for example. However, the invention is not limited in this regard, for example, category 3—type 2 cables may be utilized as well. Moreover, cables may be shielded or unshielded. The Ethernet links 132a, 132b, 133a and 133b may be enabled to handle communications administered by quality of service mechanisms for example A/V Bridging. The Ethernet link 132a may be communicatively coupled with the server 122 and the network 110 that may comprise, for example, an Ethernet bridge. In addition, the Ethernet link 132b may be communicatively coupled with the network 110 and one or more of the video display panel 126 and speakers 128a and 128b. The server 122 and the one or more video display panel 126 and speakers 128a and 128b may be enabled to exchange A/V and/or auxiliary data via the Ethernet links 132a and 132b and the network 110.

The network 110 may comprise suitable logic, circuitry and or code to transfer data between one or more data source devices for example the server 122 and one or more data destination devices for example the video display panel 126 and speakers 128a and 128b. The network 110 may comprise one or more Ethernet bridges and may operate according to IEEE 802.1D standards for example. The network 110 may support AVB services and one or more of symmetric Ethernet PHY operations and/or asymmetric multi-rate Ethernet PHY operations according to an embodiment of the invention. The network 110 may be communicatively coupled with the server 122, the video display panel 126 and speakers 128a and 128b, the digital musical instrument 123 and the speakers 125 via the Ethernet links 132a, 132b, 133a and 133b respectively.

The digital musical instrument 123 may comprise suitable logic, circuitry and/or code to transfer audio data at a high data rate to, for example, the speakers 125 via the network 110 and the Ethernet links 133a and 133b utilizing AVB services. In this regard, digital musical instrument 123 may comprise an Ethernet media access control (MAC) layer for encapsulating data in Ethernet frames and providing transmission control to the speakers 125. In addition, the MAC layer within the digital musical instrument 123 may support Audio/Video Bridging (AVB) services wherein end to end quality of service operations may be enabled according to traffic class designations associated with Ethernet frames. Moreover, the digital musical instrument 123 may comprise an asymmetric multi-rate Ethernet PHY transceiver wherein high data rate audio may be transmitted to the network 110 and lower data rate signals comprising for example control, configuration and/or security data, may be received from the network 110 via the Ethernet link 133a. Accordingly, the speaker system 125 may receive the high data rate audio signals from the network 110 and transmit the lower data rate signals to the network 110 via the Ethernet link 133b.

In operation, the server 122 may comprise A/V and/or auxiliary data that may enable rendering of the A/V data on the video display panel 126 and speakers 128a and 128b. A user may request a transfer of A/V data from the upstream server 122 via the network 110 to the down stream video display panel 126 and speakers 128a and 128b. The server 122 may process the A/V data prior to transmission. For example, the A/V data may comprise native video or may be formatted by a display interface process such as HDMI, Display Port or DVI along with auxiliary data for example. A MAC layer within the server 122 may convert the A/V and/or auxiliary data to Ethernet frames and assign the Ethernet frames a traffic class. The MAC layer within the server 122 may utilize Audio/Video Bridging (AVB) to enable timely transmissions of the Ethernet frames to the video display panel 126 and speakers 128a and 128b within specified latency constraints.

The asymmetric multi-rate Ethernet PHY transceiver may process the Ethernet frames and transmit them via the Ethernet link 132a to the network 110. The network 110 may receive the one or more Ethernet frames via a symmetric Ethernet PHY or an asymmetric multi-rate Ethernet PHY transceiver. A MAC layer within the network 110 may administer transmission of the Ethernet frames to the video display panel 126 and speakers 128a and 128b according to the specified latency constraints via a symmetric Ethernet PHY or an asymmetric multi-rate Ethernet PHY. In this regard, the video display panel 126 and speakers 128a and 128b may perform signal processing operations on the received Ethernet frames within an asymmetric multi-rate Ethernet PHY transceiver. A MAC layer within the video display panel 126 and speakers 128a and 128b may convert the Ethernet frames back to the video interface format such as HDMI, Display Port, DVI or native video and the A/V data may be rendered.

Although the A/V and/or auxiliary data may be processed by the server 122 via a display interface, for example HDMI, Display Port or DVI, such that it may be intended for point to point data exchange and may not be network aware nor comprise a means of network identification (for example a network destination address), the A/V and/or auxiliary data may be encapsulated in Ethernet frames at, for example, the server 122 and transported via Ethernet links 132a and 132b and the network 110. The encapsulated A/V and/or auxiliary data may be decapsulated at a destination device such as the video display panel 126 and speakers 128a and 128b. Accordingly, in various embodiments of the invention, the point to point oriented display interface traffic may be received by the video display panel 126 and speakers 128a and 128b as though the video display panel 126 and speakers 128a and 128b were directly attached to the server 122.

In addition, the video display panel 126 and speakers 128a and 128b may transmit lower bandwidth data upstream. The lower bandwidth data may comprise service requests, control information and/or security operation communications for example. The invention is not limited in this regard and any other suitable lower bandwidth data may be communicated on the upstream links.

The upstream lower bandwidth data may be passed to the MAC layer of the video display panel 126 and speakers 128a and 128b that may generate one or more Ethernet frames and schedule transmission of the one or more Ethernet frames to the network 110. The asymmetric multi-rate Ethernet PHY transceiver within the video display panel 126 and speakers 128a and 128b may process the one or more Ethernet frames and transmit them via the Ethernet link 132b to the network 110. The network 110 may receive the one or more Ethernet frames from the video display panel 126 and speakers 128a and 128b via a symmetric Ethernet PHY or an asymmetric multi-rate Ethernet PHY transceiver. A MAC layer within the network 110 may schedule transmission of the one or more Ethernet frames to the server 122 via a symmetric Ethernet PHY or an asymmetric multi-rate Ethernet PHY transceiver in the network 110. In this regard, the server 122 may receive the Ethernet frames and perform signal processing operations on them within the symmetric or asymmetric multi-rate Ethernet PHY transceiver. The MAC layer within the server 122 may decapsulate the lower bandwidth data and the data may be processed for operations residing within the server 122.

Figure 1B:
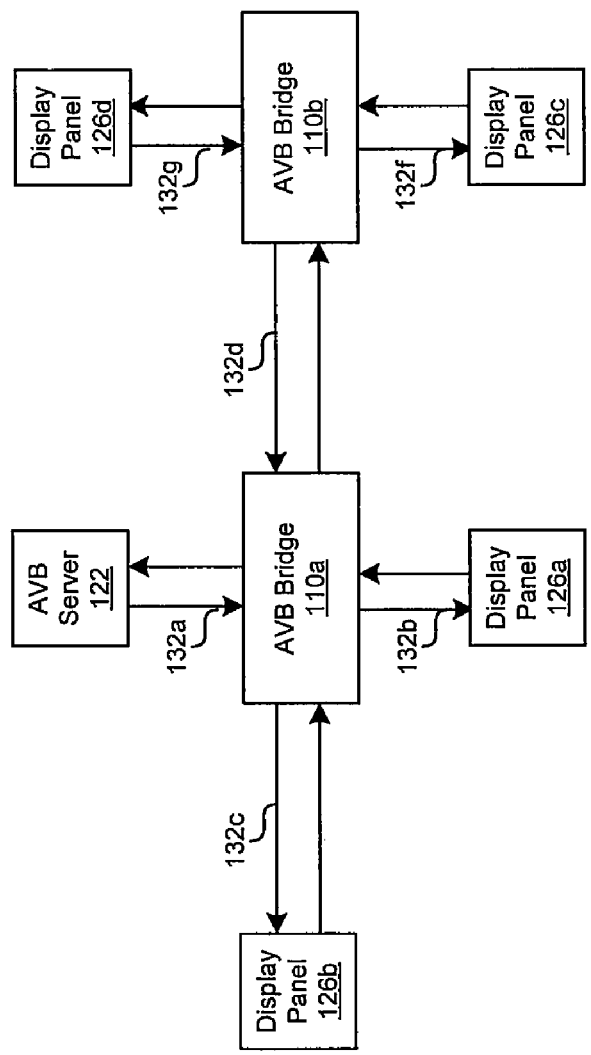
FIG. 1B is a diagram illustrating an exemplary system for transfer of video, audio and/or auxiliary data via a network comprising one or more intermediate nodes utilizing an AVB services and an asymmetric multi-rate Ethernet physical layer (PHY) connection, in accordance with an embodiment of the invention.

FIG. 1B is a block diagram illustrating an exemplary network that supports Audio/Video Bridging (AVB) and asymmetrical multi-rate Ethernet PHY communications in accordance with an embodiment of the invention. Referring to FIG. 1B, there is shown an AVB server 122, a plurality of AVB Ethernet bridges 110a and 110b, a plurality of AVB display panels 126a, 126b, 126c and 126d and a plurality of Ethernet links 132a, 132b, 132c, 132d. 132f and 132g.

The AVB server 122 in FIG. 1B may be similar or substantially the same as the server 122 in FIG. 1A. The AVB display panels 126a, 126b, 126c and 126d may each be similar to or substantially the same as the video display panel 126 and speakers 128a and 128b shown in FIG. 1A. The Ethernet links 132a, 132b, 132c, 132d, 132f and 132g may be similar to or substantially the same as the Ethernet links 132a, 132b, 133a and 133b in FIG. 1A.

The AVB bridges 110a and 110b may comprise suitable logic, circuitry and/or code that may enable AVB services within an AVB network for example, a local area network (LAN). The AVB bridges 110a and 110b may be configured to transmit and/or receive Ethernet frames via Ethernet links wherein the Ethernet links may be coupled to distinct ports within the AVB bridges 110a and 110b. For example, the AVB bridge 110a may receive and/or transmit Ethernet frames via Ethernet links 132a, 132b, 132c and 132d. The AVB bridge 110a may communicate with the AVB bridge 110b via Ethernet link 132d. The AVB bridge 110a may communicate with the AVB display panel 126a and 126b via Ethernet links 132b and 132c, respectively, as well as the AVB server 122 via the Ethernet link 132a. Moreover, the AVB Ethernet bridges 110a and 110b may comprise Ethernet PHY transceivers that may be enabled to handle symmetric and/or asymmetric multi-rate traffic. In addition, the AVB bridge 110b may be coupled to distinct ports within the AVB display panels 126c and 126d and may be enabled to transmit and/or receive Ethernet frames with AVB display panels 126c and 126d via Ethernet links 132f and 132g respectively.

Notwithstanding, one or more of the AVB server 122, AVB display panels 126a, 126b, 126c and 126d and AVB bridges 110a and 110b may comprise asymmetric multi-rate Ethernet PHY transceivers wherein high bandwidth data may be transmitted downstream from the server 122 to one or more of the display panels 126a, 126b, 126c and 126d while lower bandwidth data for example auxiliary data may be transmitted upstream from one or more of the display panels 126a, 126b, 126c and 126d to the server 122.

In operation, the AVB server 122 may be enabled to exchange AVB data streams with one or more AVB display panels 126a, 126b, 126c and 126d via the Ethernet links 132a, 132b, 132c, 132d, 132f, 132g and AVB brides 110a and 110b and wherein one or more of the AVB devices may comprise asymmetric multi-rate Ethernet PHY transceivers. For example, the AVB server 122 may exchange AVB data with one AVB display panel and/or may communicate and multicast transmissions with a plurality of participating AVB display panels.

In various embodiments of the invention, AVB devices comprising the AVB server 122, AVB display panels 126a, 126b, 126c and 126d and/or AVB bridges 110a and 110b may associate with each other based on an exchange of logical link discovery protocol (LLDP) messages, which may be periodically transmitted from the respective devices. The LLDP messages describe the attributes of the device that transmits the message. For example, the AVB server 122 may transmit LLDP messages, which describe the attributes of the AVB server 122 via Ethernet link 132a. Similarly, the AVB bridge 110a may transmit LLDP messages, which describe the attributes of the AVB bridge 110a via Ethernet links 132a, 132b, 132c and 132d. In a substantially similar manner, the bridge 110b and AVB display panels 126a, 126b, 126c and 126d may transmit one or more LLDP messages that may describe their respective attributes via their respective coupled Ethernet links.

The LLDP messages may comprise a "time-synch" capable attribute and an AVB-capable attribute. An AVB enabled device such as the server 122, AVB display panels 126a, 126b, 126c and 126d and bridges 110a and 110b, that receives an LLDP message, that may comprise the time-synch-capable attribute and AVB-capable attribute via a port, may label the port to be an "AVB" port. Labeling the port to be an AVB port may enable the AV device to utilize AVB services. The AVB devices, which may be reachable via the port, may be referred to as "participating" devices. The participating devices may utilize AVB services and may be enabled to transmit AVB streams among the participating AVB device.

Prior to transmitting the AVB data streams, a source of the transmission for example the AVB server 122 may propagate requests for reservation of resources among the participating AVB devices. The reservation message may comprise a set of reservation parameters, for example, QoS descriptors based on a traffic class designation. AVB devices enabled to receive the transmitted AVB data streams, for example, one or more of the AVB display panels 126a, 126b, 126c and 126d may register requests for delivery of the AVB streams. The invention is not limited in this regard, for example, one or more AVB display panels 126a, 126b, 126c and 126d may be the source of an auxiliary data stream transmission and may propagate a request for reservation of resources while the server 122 and/or another participating device may register a request for delivery of the auxiliary data stream.

Ethernet frames may comprise time stamps which may enable the AVB network to transport the Ethernet frames along an end to end path from a data source to a data destination such that the latency of the transport along the path may be within specified latency targets or desired values. For example, the path from the AVB server 122 to the AVB display panel 126c may comprise the Ethernet link 132a, the AVB bridge 110a, the Ethernet link 132d, the AVB bridge 110b and the Ethernet link 132f. Along the path, the AVB bridge 110a may utilize the time stamps to determine a time interval for queuing and forwarding of Ethernet frames received via the interface 132a and forwarded via the interface 132d. Similarly, the AVB bridge 110b may utilize the time stamps to determine a time interval for the queuing and forwarding of Ethernet frames received via the Ethernet interface 132d and forwarded via the interface 132f.

Figure 2:
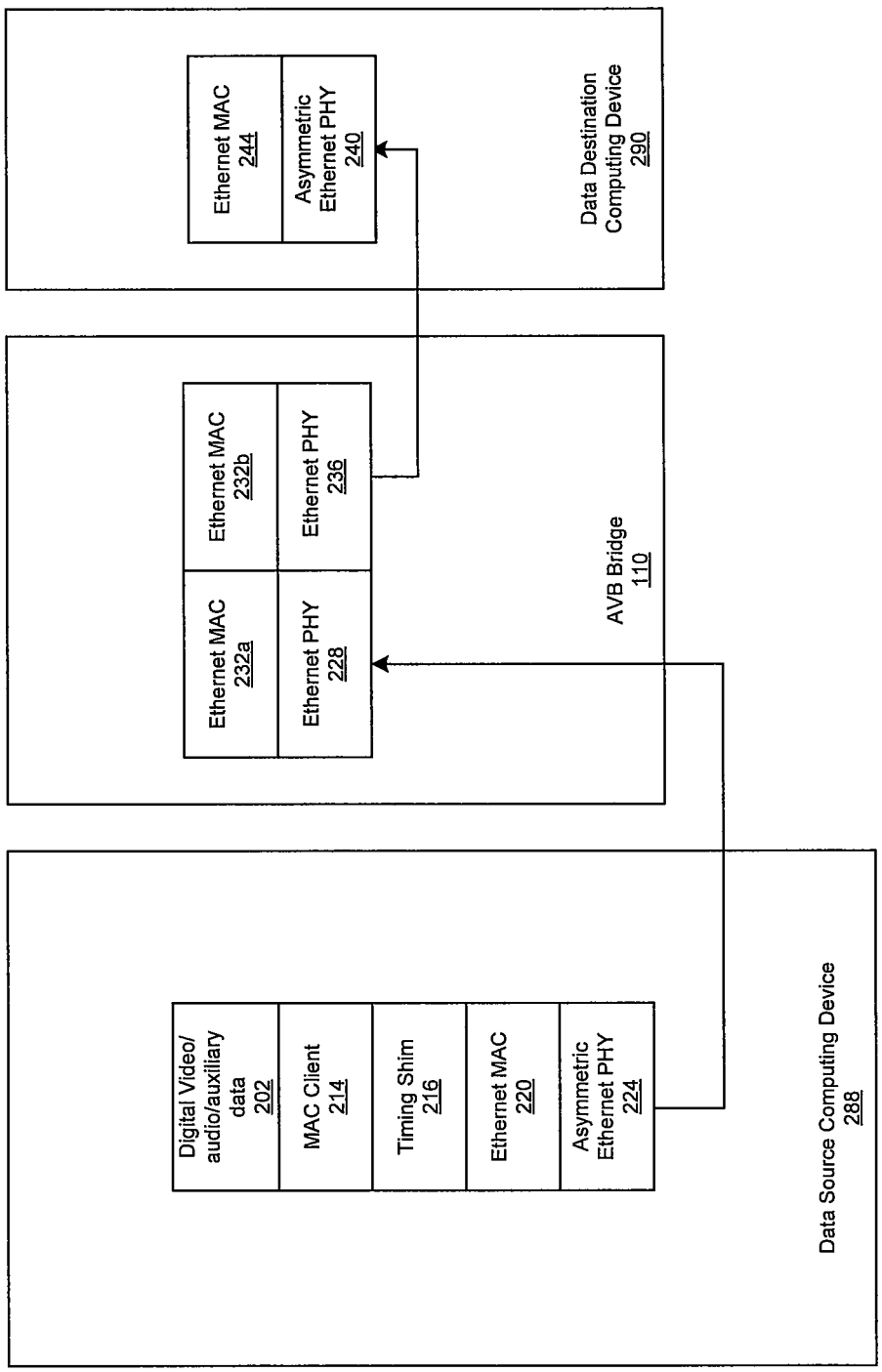
FIG. 2 is a diagram illustrating exemplary processes utilized in AVB managed data transfers from an upstream link partner to a downstream link partner utilizing asymmetric Ethernet multi-rate PHY technology, in accordance with an embodiment of the invention.

FIG. 2 is a diagram illustrating exemplary transfer of video, audio and/or auxiliary data traffic across a network utilizing Audio/Video Bridging (AVB), in accordance with an embodiment of the invention. Referring to FIG. 2, there is shown a data source computing device 288 comprising a digital video/audio/auxiliary data block 202, a MAC client block 214, a timing shim block 216, an Ethernet MAC block 220 and an asymmetric multi-rate Ethernet PHY block 224. In addition, an AVB bridge 110 may comprise a symmetric Ethernet PHY and/or an asymmetric multi-rate Ethernet PHY 228, an Ethernet MAC block 232a, an Ethernet MAC block 232b and a symmetric Ethernet PHY and/or an asymmetric multi-rate Ethernet PHY 236. Moreover, a data destination computing device 290 may comprise an asymmetric multi-rate Ethernet PHY 240 and an Ethernet MAC 244 with high layer processes.

The data source computing device 288 may comprise suitable logic, circuitry and/or code that may enable handling video, audio and/or auxiliary data. In addition, the data source computing device 288 may utilize Audio/Video Bridging (AVB) services. The data source computing device 288 may be an upstream link partner wherein an asymmetrical multi-rate Ethernet PHY transceiver 224 may be configured to transmit high frequency data for example video, audio and/or auxiliary data and receive lower frequency auxiliary data. The data source computing device 288 may be similar or substantially the same as the server 122 described in FIGS. 1A and 1B for example.

Moreover the data destination computing device 290 may comprise suitable logic, circuitry and/or code that may enable handling video, audio and/or auxiliary data. In addition, the data destination computing device 290 may utilize Audio Video Bridging (AVB) services. The data destination computing device 290 may be a downstream link partner wherein an asymmetrical multi-rate Ethernet PHY transceiver 240 within the data destination device 290 may be configured to receive high frequency data for example video, audio and/or auxiliary data and transmit lower frequency auxiliary data. The data destination computing device 290 may be similar or substantially the same as the video display panel 126 and speakers 128a and 128b described in FIG. 1A or display panels 126a, 126b, 126c and 126d in FIG. 1B for example.

The AVB bridge 110 may be similar or substantially the same as the bridges 110a and/or 110b in FIGS. 1A and/or 1B.

The digital video, audio and/or auxiliary data 202 may be stored in memory and/or may be generated by one or more applications that may be executing within the data source computing device 288. The digital video, audio and/or auxiliary data 202 may be encrypted or unencrypted and may be compressed or uncompressed. The digital video, audio and/or auxiliary data 202 may be passed to the MAC client 214.

In another embodiment of the invention, the digital video, audio and/or auxiliary data 202 may be passed to a display interface encapsulation process wherein the digital video, audio and/or auxiliary data 202 may be encapsulated into a format such as HDMI, Display Port or DVI for example. The display interface encapsulated digital video, audio and/or auxiliary data 202 may comprise instructions to enable rendering of the data on the data destination computing device 290. In addition, the digital video, audio and/or auxiliary data 202 may be encapsulated to an Ethernet payload format. Accordingly, Ethernet payloads may comprise compressed, uncompressed, packetized, unpacketized, encapsulated, decapsulated or otherwise processed data so as to be formatted as one or more video or multimedia streams. For example, one or more of IP datagrams, HDMI datastreams, DVI datastreams, DisplayPort datastreams, raw video, and/or raw audio/video may be converted to an Ethernet payload. The Ethernet payload may be passed to the MAC client block 214.

The MAC client block 214 may comprise suitable logic, circuitry, and/or code that may enable reception of digital video, audio and/or auxiliary data 202 and/or the Ethernet payloads and may enable encapsulation of the digital video, audio and/or auxiliary data 202 and/or the Ethernet payloads in one or more Ethernet frames. The Ethernet frames may be passed to the timing shim 216.

The timing shim 216 may comprise suitable logic, circuitry and/or code that may enable reception of Ethernet frames the MAC client block 214. The timing shim 216 may append time synchronization information, such as a time stamp, to the Ethernet frames. The timing shim 216 may, for example, append a time stamp when an Ethertype field within the Ethernet frame indicates that the Ethernet frame is enabled to utilize AVB capabilities for transport across a network. The timing shim 216 may pass the appended Ethernet frames to the Ethernet MAC 220.

The Ethernet MAC 220 may comprise suitable logic, circuitry, and or code that may enable addressing and/or access control to a network and may enable the transmission of the Ethernet frames via a network. In this regard, the Ethernet MAC 220 may be enabled to buffer, prioritize, or otherwise coordinate the transmission and/or reception of data via the asymmetrical multi-rate Ethernet PHY 224. The Ethernet MAC 220 may be enabled to perform additional packetization, depacketization, encapsulation, and decapsualtion of data. The Ethernet MAC 220 may enable generation of header information within the Ethernet frames, which enable the utilization of AVB services within a network for transport of the Ethernet frames. The Ethernet MAC 220 may also enable traffic shaping of transmitted Ethernet frames by determining time instants at which Ethernet frames may be transmitted to a network. The Ethernet MAC 220 may also enable generation of header information within the Ethernet frames, which utilize conventional Ethernet services. The conventional Ethernet services may not utilize traffic shaping and/or AVB services for example. The Ethernet MAC 220 may pass the Ethernet frames and/or link management control signals to the asymmetric multi-rate Ethernet PHY 224.

The asymmetric multi-rate Ethernet PHY 224 may process the Ethernet frames and enable transport of the Ethernet frames to the AVB bridge 110 utilizing AVB services. The asymmetric multi-rate Ethernet PHY 224 may be enabled to convert between digital values and analog symbols impressed on the physical medium.

The asymmetric multi-rate Ethernet PHY 228 may be configured to receive Ethernet frames from the data source computing device 288. The Ethernet bridge 110 may receive the Ethernet frames via the asymmetrical multi-rate Ethernet PHY 228 wherein the received Ethernet signals may be processed by asymmetric multi-rate Ethernet PHY operations. The Ethernet frames may be passed to the Ethernet MAC 232a.

The Ethernet MAC 232a may enable the Ethernet bridge 110 to receive the Ethernet frames from the data source computing device 288 and may determine that the data destination computing device 290 is the destination for receipt of the Ethernet frames. The Ethernet MAC layer 232b may utilize time stamp information and quality of service descriptors to schedule the transmission of the Ethernet frames to the data destination device 290. The MAC 232b may pass the Ethernet frames to the asymmetric multi-rate Ethernet PHY 236, which may enable transport of the Ethernet frames to the data destination computing device 290.

Within the data destination computing device 290, the asymmetric multi-rate Ethernet PHY 240 may receive the Ethernet frames that may be subsequently sent to the Ethernet MAC 244. The Ethernet MAC 244 may extract the Ethernet payloads and information comprised in fields of the Ethernet frames as well as any information comprised within additional encapsulation fields if present, for example, display interface fields and may reconstruct the digital video/audio/auxiliary data according to information therein. The MAC layer may determine the type of data extracted and/or reconstructed from the frame and/or encapsulation fields and may process, store and/or forward the data accordingly. The MAC layer may determine that data may be forwarded to higher level applications for rendering of the video and/or audio content.

Figure 3:
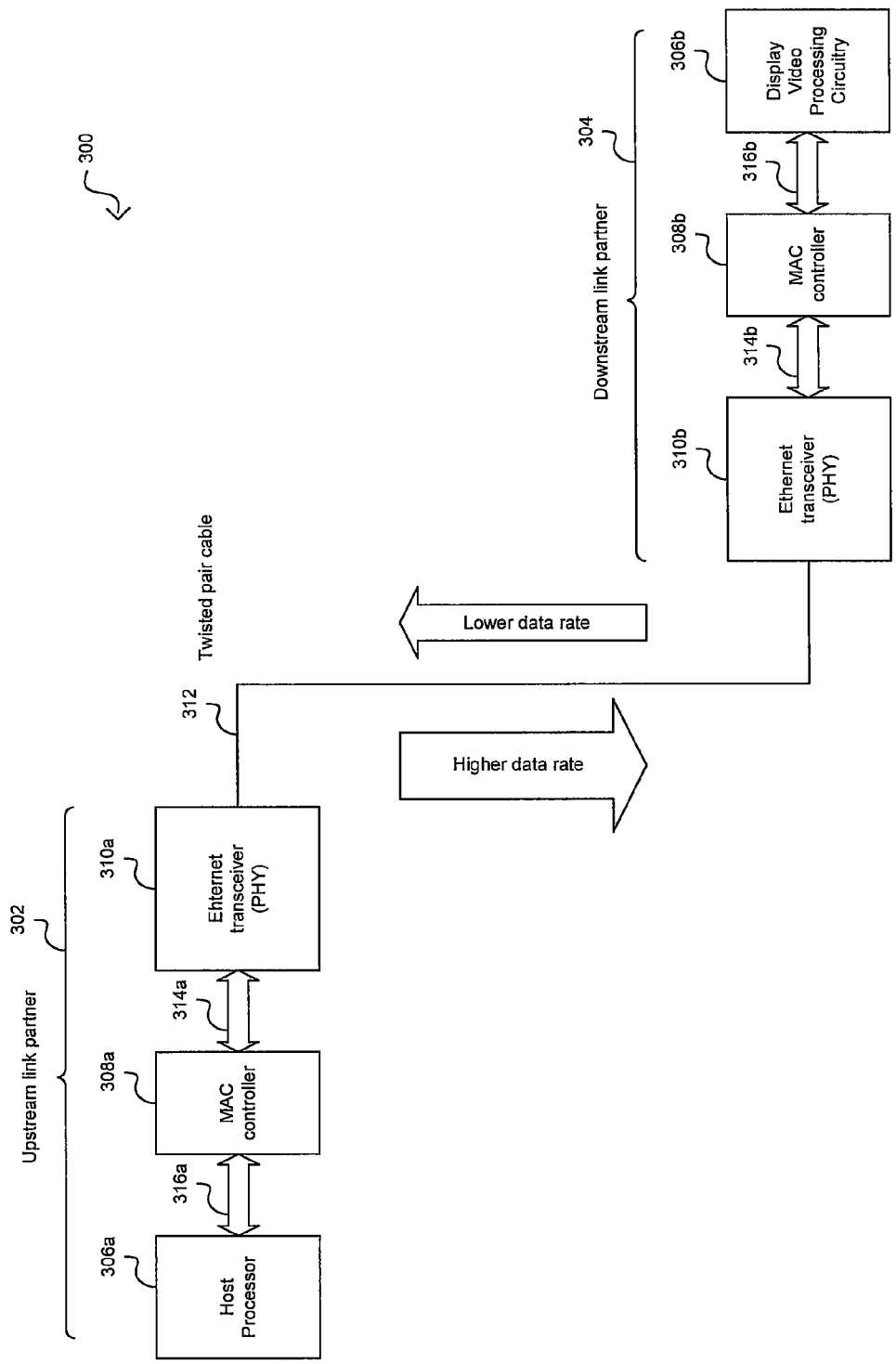
FIG. 3 is a block diagram illustrating an Ethernet system over twisted-pair cabling link between an upstream link partner and a downstream link transmitting asymmetric data traffic with AVB services, in connection with an embodiment of the invention.

FIG. 3 is a block diagram illustrating an Ethernet system over twisted-pair cabling link between an upstream link partner and a downstream link partner for asymmetric data traffic supported by Audio Video Bridging (AVB) services, in connection with an embodiment of the invention. Referring to FIG. 3, there is shown a system 300 that comprises an upstream link partner 302 and a downstream link partner 304. The upstream link partner 302 may comprise a host processing block 306a, a medium access control (MAC) controller 308a, and a transceiver 304a. The downstream link partner 304 may comprise a display video processing block 306b, a MAC controller 308b, and a transceiver 310b. Notwithstanding, the invention is not limited in this regard.

The upstream link partner 302 and the downstream link partner 304 communicate via a cable 312. The cable 312 may be a four-pair unshielded twisted-pair (UTP) copper cabling, for example. Certain performance and/or specifications criteria for UTP copper cabling have been standardized. An exemplary Ethernet connection may comprise category 5 category 5e, category 6, category 6a, category 7 or better cabling for example. However, the invention is not limited in this regard, for example, category 3—type 2 cables may be utilized as well. Moreover, cables may be shielded or unshielded. For example, Category 5 or Category 5e cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In some embodiments of the invention, non standard speeds for example 2.5 Gbps and 5 Gbps may be utilized. In most instances, a lower category cable may generally have a greater insertion loss than a higher category cable.

The transceiver 310a may comprise suitable logic, circuitry, and/or code that may enable asymmetric Ethernet communication, such as transmission and reception of data, for example, between the upstream link partner 302 and the downstream link partner 304, for example. In this regard, the transceiver 310a may enable transmission at a high data rate to the downstream link partner 304 while also enabling reception at a low data rate from the downstream link partner 304. Similarly, the transceiver 310b may comprise suitable logic, circuitry, and/or code that may enable asymmetric Ethernet communication between the downstream link partner 304 and the upstream link partner 302, for example. In this regard, the transceiver 310b may enable transmission at a low data rate to the upstream link partner 302 while also enabling reception at a high data rate from the upstream link partner 302.

The data transmitted and/or received by the transceivers 310a and 310b may be formatted in a manner that may be compliant with the well-known OSI protocol standard, for example. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. In this regard, the transceiver 310a may enable PHY layer operations that are utilized for asymmetric data communication with the downstream link partner 304. Moreover, the transceiver 310a may enable PHY layer operations that are utilized for asymmetric data communication with the upstream link partner 302.

The transceivers 310a and 310b may enable asymmetric multi-rate communications. In this regard, the data rate in the upstream and/or the downstream direction may be <10 Mbps, 10 Mbps, 100 Mbps, 1000 Mbps (or 1 Gbps) and/or 10 Gbps, for example. The transceivers 310a and 310b may support standard-based asymmetric data rates and/or non-standard asymmetric data rates. The transceivers 310a and 310b may utilize multilevel signaling in their operation. In this regard, the transceivers 310a and 310b may utilize pulse amplitude modulation (PAM) with various levels to represent the various symbols to be transmitted. For example, for 1000 Mbps Ethernet applications, a PAM5 transmission scheme may be utilized in each twisted-pair wire, where PAM5 refers to PAM with five levels $\{-2, -1, 0, 1, 2\}$. In another exemplary embodiment of the invention, for 10 Gbps Ethernet applications, a PAM 16 scheme may be utilized in each twisted-pair wire with levels $\{-15, -13, -11, -9, -7, -5, -3, -1, 1, 3, 5, 7, 9, 11, 13, 15\}$ where two successive PAM 16 symbols are used to define a 128 point, two dimensional constellation referred to in the IEEE 802.3 standard as 128 Double Square (DSQ).

The transceivers 310a and 310b may be configured to handle all the physical layer requirements, which may include, but are not limited to, packetization, data transfer and serialization/deserialization (SERDES), in instances where such an operation is required. Data packets received by the transceivers 310a and 310b from MAC controllers 308a and 308b, respectively, may include data and header information for each of the above six functional layers. The transceivers 310a and 310b may be configured to encode data packets that are to be transmitted over the cable 312 and/or to decode data packets received from the cable 312.

The MAC controller 308a may comprise suitable logic, circuitry, and/or code that may enable handling of data link layer, layer 2, operability and/or functionality in the upstream link partner 302. Similarly, the MAC controller 308b may comprise suitable logic, circuitry, and/or code that may enable handling of layer 2 operability and/or functionality in the downstream link partner 304. The MAC controllers 308a and 308b may be configured to implement Ethernet protocols, such as those based on the IEEE 802.3 standard, for example. In various embodiments of the invention, one or more nodes, for example one or more Ethernet bridges, may be communicatively coupled to the upstream link partner 302 and the downstream link partner 304 such that data streams may be transported between the link partners via the one or more of the nodes. In this regard, Audio/Video Bridging protocol such as IEEE 802.1AS may be utilized to synchronize the upstream link partner 302 and the downstream link partner 304. Accordingly, an Audio/Video Bridging protocol such as IEEE 802.1Qat may be utilized to reserve resources for the data streams. In this regard, nodes comprised within the reserved path may implement IEEE 802.1Qav to govern forwarding and queuing of time sensitive data. Notwithstanding, the invention is not limited in this regard.

The MAC controller 308a may communicate with the transceiver 310a via an interface 314a and with the host processing block 306a via a bus controller interface 316a. The MAC controller 308b may communicate with the transceiver 310b via an interface 314b and with the display video processing block 306b via a bus controller interface 316b. The interfaces 314a and 314b correspond to Ethernet interfaces that comprise protocol and/or link management control signals. The interfaces 314a and 314b may be multi-rate interfaces. The bus controller interfaces 316a and 316b may correspond to PCI or PCI-X interfaces. Notwithstanding, the invention is not limited in this regard.

The host processing block 306a and the display video processing block 306b may comprise suitable logic, circuitry and/or code to enable graphics processing and/or rendering operations. The host processing block 306a and/or the display video processing block 306b may comprise dedicated graphics processors and/or dedicated graphics rendering devices. The host processing block 306a and the display video processing block 306b may be communicatively coupled with the MAC 308a and the MAC 308b respectively via the bus controller interfaces 316a and 316b respectively.

In the embodiment of the invention illustrated in FIG. 3, the host processing block 306a and the display video processing block 306b may represent layer 3 and above, the MAC controllers 308a and 308b may represent layer 2 and above and the transceivers 310a and 310b may represent the operability and/or functionality of layer 1 or the PHY layer. In this regard, the host processing block 306a and the display video processing block 306b may comprise suitable logic, circuitry, and/or code that may enable operability and/or functionality of the five highest functional layers for data packets that are to be transmitted over the cable 312. Since each layer in the OSI model provides a service to the immediately higher interfacing layer, the MAC controllers 308a and 308b may provide the necessary services to the host processing block 306a and the display video processing block 306b to ensure that data are suitably formatted and communicated to the transceivers 310a and 310b. During transmission, each layer may add its own header to the data passed on from the interfacing layer above it. However, during reception, a compatible device having a similar OSI stack may strip off the headers as the message passes from the lower layers up to the higher layers.

Figure 4:
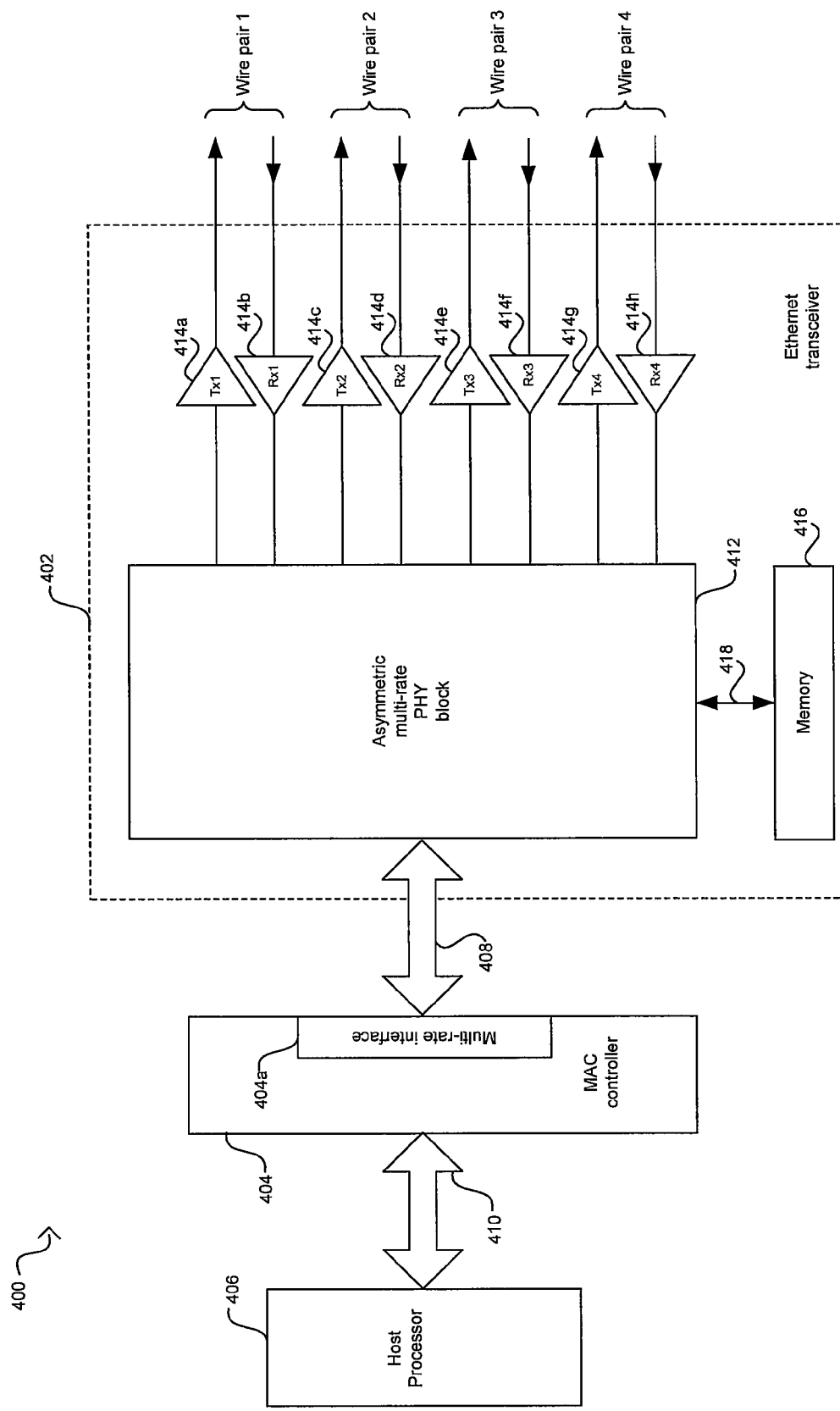
FIG. 4 is a block diagram illustrating an exemplary Ethernet transceiver architecture comprising an asymmetric multi-rate PHY, in accordance with an embodiment of the invention.

FIG. 4 is a block diagram illustrating an exemplary Ethernet transceiver architecture comprising an asymmetric multi-rate PHY, in accordance with an embodiment of the invention. Referring to FIG. 4, there is shown a link partner 400 that may comprise a transceiver 402, a MAC controller 404, a host processing block 406, an interface 408, and a bus controller interface 410.

The transceiver 402 may be an integrated device that comprises an asymmetric multi-rate PHY block 412, a plurality of transmitters 414a, 414c, 414e, and 414g, a plurality of receivers 414b, 414d, 414f, and 414h, a memory 416, and a memory interface 418. The operation of the transceiver 402 may be the same as or substantially similar to the transceivers 310a and 310b as described in FIG. 3. For example, when the transceiver 402 is utilized in an upstream link partner, the transceiver 402 may enable a high rate for data transmission and a low rate for data reception. In another example, when the transceiver 402 is utilized in a downstream link partner, the transceiver 402 may enable a low rate for data transmission and a high rate for data reception. In this regard, the transceiver 402 may provide layer 1 or PHY layer operability and/or functionality that enables asymmetric data traffic.

Similarly, the operation of the MAC controller 404, the host processing block 406, the interface 408, and the bus controller 410 may be the same as or substantially similar to the respective MAC controllers 308a and 308b, the host processing block 306a and the display video processing block 306b, interfaces 314a and 314b, and bus controller interfaces 316a and 316b as disclosed in FIG. 3. In this regard, the MAC controller 404, the host processing block 406, the interface 408, and the bus controller 410 may enable different data transmission and/or data reception rates when implemented in an upstream link partner or a downstream link partner. The MAC controller 404 may comprise a multi-rate interface 404a that may comprise suitable logic, circuitry, and/or code to enable communication with the transceiver 402 at a plurality of data rates via the interface 408.

The asymmetric multi-rate PHY block 412 in the transceiver 402 may comprise suitable logic, circuitry, and/or code that may enable operability and/or functionality of PHY layer requirements for asymmetric data traffic. The asymmetric multi-rate PHY block 412 may communicate with the MAC controller 404 via the interface 408. In one aspect of the invention, the interface 408 may be configured to utilize a plurality of serial data lanes for receiving data from the asymmetric multi-rate PHY block 412 and/or for transmitting data to the asymmetric multi-rate PHY block 412, in order to achieve higher operational speeds such as Gbps, 10 Gbps or higher speeds for example. The asymmetric multi-rate PHY block 412 may be configured to operate in one or more of a plurality of communication modes, where each communication mode implements a different communication protocol. These communication modes may include, but are not limited to, IEEE 802.3, 10GBASE-T, other similar protocols and/or non-standard communication protocols that enable asymmetric data traffic. The asymmetric multi-rate PHY block 412 may be configured to operate in a particular mode of operation upon initialization or during operation. The asymmetric multi-rate PHY block 412 may also be configured to operate in an extended range mode.

The asymmetric multi-rate PHY block 412 may be coupled to memory 416 through the memory interface 418, which may be implemented as a serial interface or a bus. The memory 416 may comprise suitable logic, circuitry, and/or code that may enable storage or programming of information that includes parameters and/or code that may effectuate the operation of the asymmetric multi-rate PHY block 412. The parameters may comprise configuration data and the code may comprise operational code such as software and/or firmware, but the information need not be limited in this regard. Moreover, the parameters may include adaptive filter and/or block coefficients for use by the asymmetric multi-rate PHY block 412, for example.

The transmitters 414a, 414c, 414e, and 414g may comprise suitable logic, circuitry, and/or code that may enable transmission of data from a transmitting link partner to a remote link partner via the cable 312 in FIG. 3, for example. In this regard, when the transmitting link partner is an upstream link partner, the transmitters 414a, 414c, 414e, and 414g may operate at a higher data rate than the data rate received from the downstream link partner. Similarly, when the when the transmitting link partner is a downstream link partner, the transmitters 414a, 414c, 414e, and 414g may operate at a lower data rate than the data rate received from the upstream link partner.

The receivers 414b, 414d, 414f, and 414h may comprise suitable logic, circuitry, and/or code that may enable receiving data from a remote link partner via the cable 312, for example. In this regard, when the receiving link partner is an upstream link partner, the receivers 414b, 414d, 414f, and 414h may operate at a lower data rate than the data rate transmitted to the downstream link partner. Similarly, when the when the receiving link partner is a downstream link partner, the receivers 414b, 414d, 414f, and 414h may operate at a higher data rate than the data rate transmitted to the upstream link partner.

Each of the four pairs of transmitters and receivers in the transceiver 402 may correspond to one of the four wire pairs in the cable 312. For example, transmitter 414a and receiver 414b may be utilized to asymmetrically communicate data with a remote link partner via the first wire pair in the cable 312. Similarly, transmitter 414g and receiver 414h may be utilized to asymmetrically communicate data with a remote link partner via the fourth wire pair in the cable 312. In this regard, at least one of the four transmitter/receiver pairs may be enabled to provide the appropriate communication rate. The above-disclosed scheme may be applied to fewer, or greater, number of wires, for example.

Figure 5:
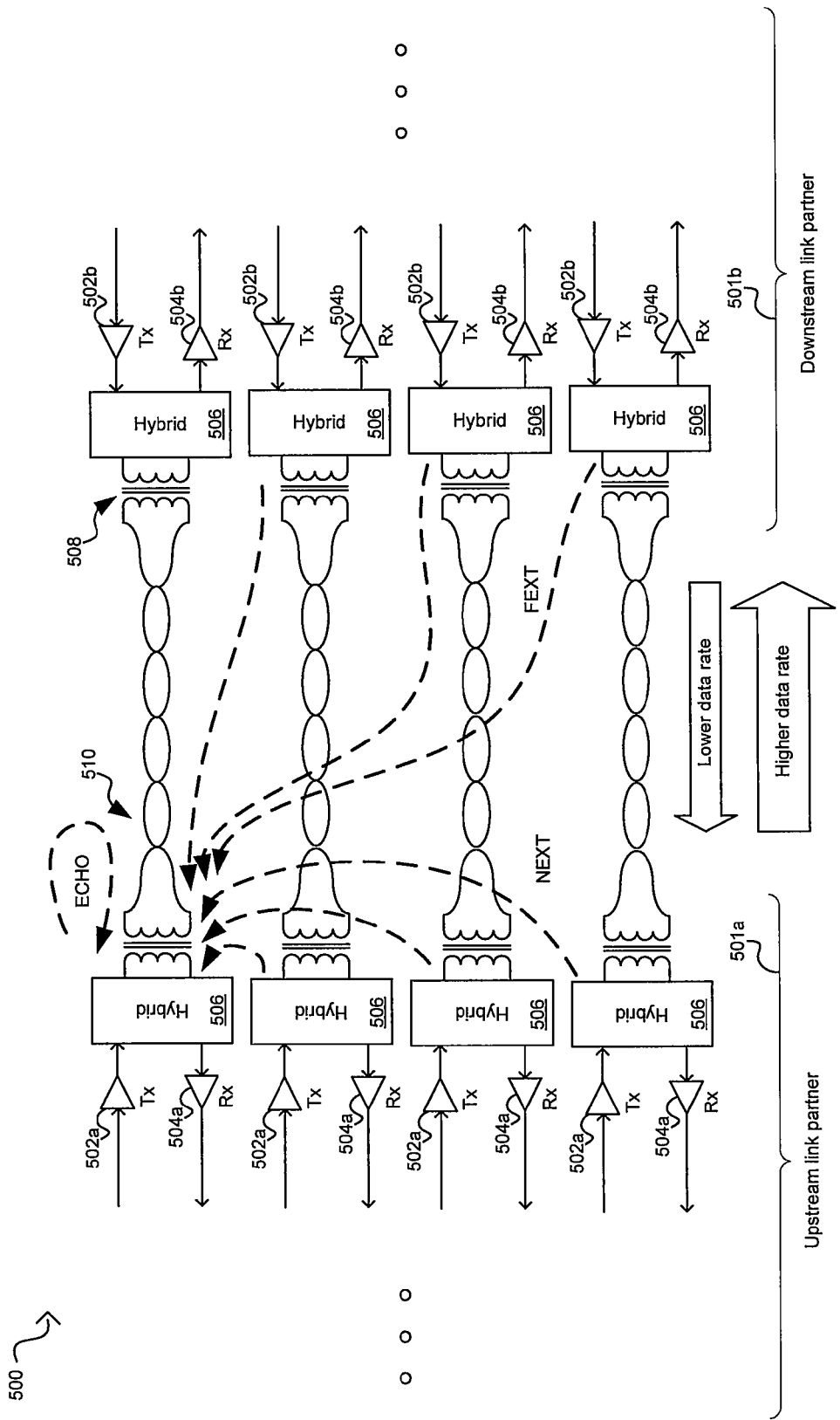
FIG. 5 is a block diagram illustrating ECHO, NEXT, and FEXT channel conditions in an Ethernet system, in accordance with an embodiment of the invention.

FIG. 5 is a block diagram illustrating ECHO, NEXT, and FEXT channel conditions in an Ethernet system, in accordance with an embodiment of the invention. Referring to FIG. 5, there is shown an asymmetric Ethernet system 500 that may comprise an upstream link partner 501a and a downstream link partner 501b. The upstream link partner 501a and the downstream link partner 501b may asymmetrically communicate data via four twisted-pair wires 510 in full duplex operation. Each of the four twisted-pair wires 510 may support a portion of the data rates that may be necessary to provide the aggregate upstream and downstream data traffic. In this regard, each of the four twisted-pair wires 510 may support an equal or even or an unequal or uneven portion of the aggregate upstream and downstream data traffic.

The upstream link partner 501a may comprise four hybrids 506. Each hybrid 506 in the upstream link partner 501a may be communicatively coupled to a transmitter 502a, a receiver 504a, and to one of the four twisted-pair wires 510. Similarly, the downstream link partner 501b may comprise four hybrids 506. Each hybrid 506 in the downstream link partner 501b may be communicatively coupled to a transmitter 502b, a receiver 504b, and to one of the four twisted-pair wires 510. The portions of the upstream link partner 501a and the downstream link partner 501b shown in FIG. 5 may correspond to a portion of the physical (PHY) layer operations supported by the upstream link partner 501a and by the downstream link partner 501b respectively.

Each hybrid 506 in the upstream link partner 501a or in the downstream link partner 501b may be communicatively coupled to or comprise a transformer 508. The hybrid 506 may comprise suitable logic, circuitry, and/or code that may enable separating the transmitted and received signals from a twisted-pair wire 510. The transmitters 502a and 502b may comprise suitable logic, circuitry, and/or code that may enable generating signals to be transmitted to a link partner at the other end of the link via a hybrid 506 and a twisted-pair wire 510. In this regard, the transmitters 502a may operate at a higher data rate than the transmitters 502b. The receivers 304 may comprise suitable logic, circuitry, and/or code that may enable processing signals received from a link partner at the other end of the link via a twisted-pair wire 510 and a hybrid 506. In this regard, the receivers 504a may operate at a lower data rate than the receivers 504b.

During operation, several conditions may occur in each of the twisted-pair wires 510. For example, intersymbol interference (ISI) may occur as a result of frequency dependent wire attenuation. As shown in FIG. 5, an ECHO component may be received in a twisted-pair wire 510 from an echo that results from the transmitter 502a in the upstream link partner 501a on the same twisted-pair wire 510. A near-end crosstalk (NEXT) component may also be received in a twisted-pair wire 510 from the local transmitters 502a corresponding to the three adjacent twisted-pair wires 510 in the upstream link partner 501a. Moreover, a far-end crosstalk (FEXT) component may also be received in a twisted-pair wire 510 from the transmitters 502b in the downstream link partner 501b at the other end of the link. Similar conditions may also occur in the downstream link partner 501b, for example.

Figure 6A:
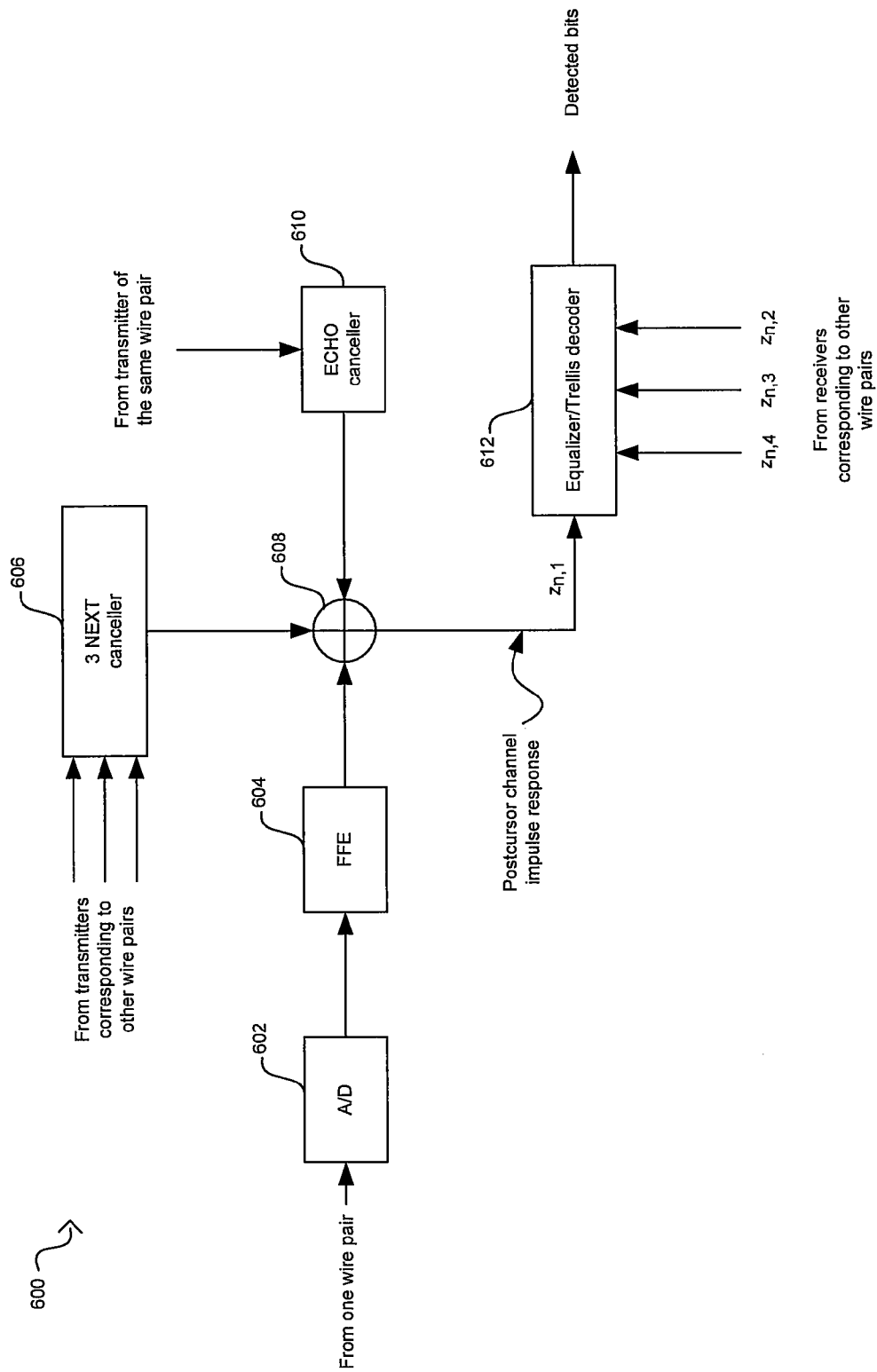
FIG. 6 is a block diagram illustrating exemplary 10 Gigabit signal processing operations for received signals in an Ethernet system utilized for asymmetric data traffic, in accordance with an embodiment of the invention.

FIG. 6A is a block diagram illustrating exemplary Gigabit signal processing operations for received signals in an Ethernet system utilized for asymmetric data traffic, in accordance with an embodiment of the invention. Referring to FIG. 6A, there is shown a signal processing system 600 that may provide a portion of the signal processing performed by the physical (PHY) layer operations in an Ethernet transceiver that supports asymmetric multi-rate operation. For example, the signal processing system 600 may be implemented in the asymmetric multi-rate PHY block 412 and/or in the receivers 414b, 414d, 414f, and 414h in FIG. 4. The signal processing system 600 may comprise an analog-to-digital converter (A/D) 602, an adaptive feed-forward equalizer (FFE) 604, a 3 NEXT canceller 606, an adder 608, an ECHO canceller 610, and an equalizer/trellis decoder 612.

The A/D 602 may comprise suitable logic, circuitry, and/or code that may enable converting analog signals received via a twisted-pair wire into digital signals. The output of the A/D 602 may be communicated to the FFE 604. The FFE 604 may comprise suitable logic, circuitry, and/or code that may enable removal of precursor ISI to make the channel minimum-phase and to whiten the noise in the channel. The 3 NEXT canceller 606 may comprise suitable logic, circuitry, and/or code that may enable canceling at least a portion of the NEXT component received in the twisted-pair wire from the local transmitters corresponding to the three adjacent twisted-pair wires. The ECHO canceller 610 may comprise suitable logic, circuitry, and/or code that may enable canceling at least a portion of the ECHO component received in the twisted-pair wire from the local transmitter on the same twisted-pair wire.

The adder 608 may comprise suitable logic, circuitry, and/ or code that may enable adding the output of the FFE 604, the 3 NEXT canceller 606, and/or the ECHO canceller to generate a postcursor channel impulse response, $z_{n,1}$. The equalizer/trellis decoder 612 may comprise suitable logic, circuitry and/or code that may enable equalizing the ISI that may result from the postcursor impulse response and decoding the trellis code. The equalizer/trellis decoder 612 may receive as inputs the postcursor channel impulse responses, $z_{n,2}$, $z_{n,3}$, and $z_{n,4}$ the corresponding to the other twisted-pair wires. The equalizer/trellis decoder 612 may generate the detected bits that correspond to the received analog signal.

FIG. 6B is a block diagram illustrating exemplary separate equalization and decoding signal processing operations, in accordance with an embodiment of the invention. Referring to FIG. 6B, there is shown the equalizer/trellis decoder 612 as described in FIG. 6A that may be implemented as separate equalization and trellis decoding operations. The equalizer/trellis decoder 612 may comprise four decision-feedback equalizers (DFE) 620 and a trellis-coded modulation (TCM) decoder 622. The DFE 620 may comprise suitable logic, circuitry, and/or code that may enable removing the postcursor ISI for each twisted-pair wire. The TCM decoder 622 may comprise suitable logic, circuitry, and/or code that may enable executing a Viterbi algorithm on the code trellis to decode the trellis-coded symbols. The TCM decoder 622 may be implemented using a parallel decision-feedback decoding architecture, for example. The separate equalization and trellis decoding approach may provide low implementation complexity and higher data rates, such as Gbps, for example, may be easily achieved.

FIG. 6C is a block diagram illustrating exemplary joint equalization and decoding signal processing operations, in accordance with an embodiment of the invention. Referring to FIG. 6C, there is shown the equalizer/trellis decoder 612 as described in FIG. 6A that may be implemented as joint equalization and trellis decoding operations. The equalizer/trellis decoder 612 may comprise a decision-feedback prefilter (DFP) block 650 and a look-ahead parallel decision-feedback decoder (LA-PDFD) 652. The DFP block 650 may comprise four DFPs 654, one for each twisted-pair wire. The DFP 654 may comprise suitable logic, circuitry, and/or code that may enable shortening the postcursor channel memory. The LA-PDFP 652 may comprise suitable logic, circuitry, and/or code that may enable computing branch metrics in a look-ahead fashion. The training and adaptation of the channel coefficients may be utilized to improve the performance of the equalizer/trellis decoder 612.

Figure 6D:
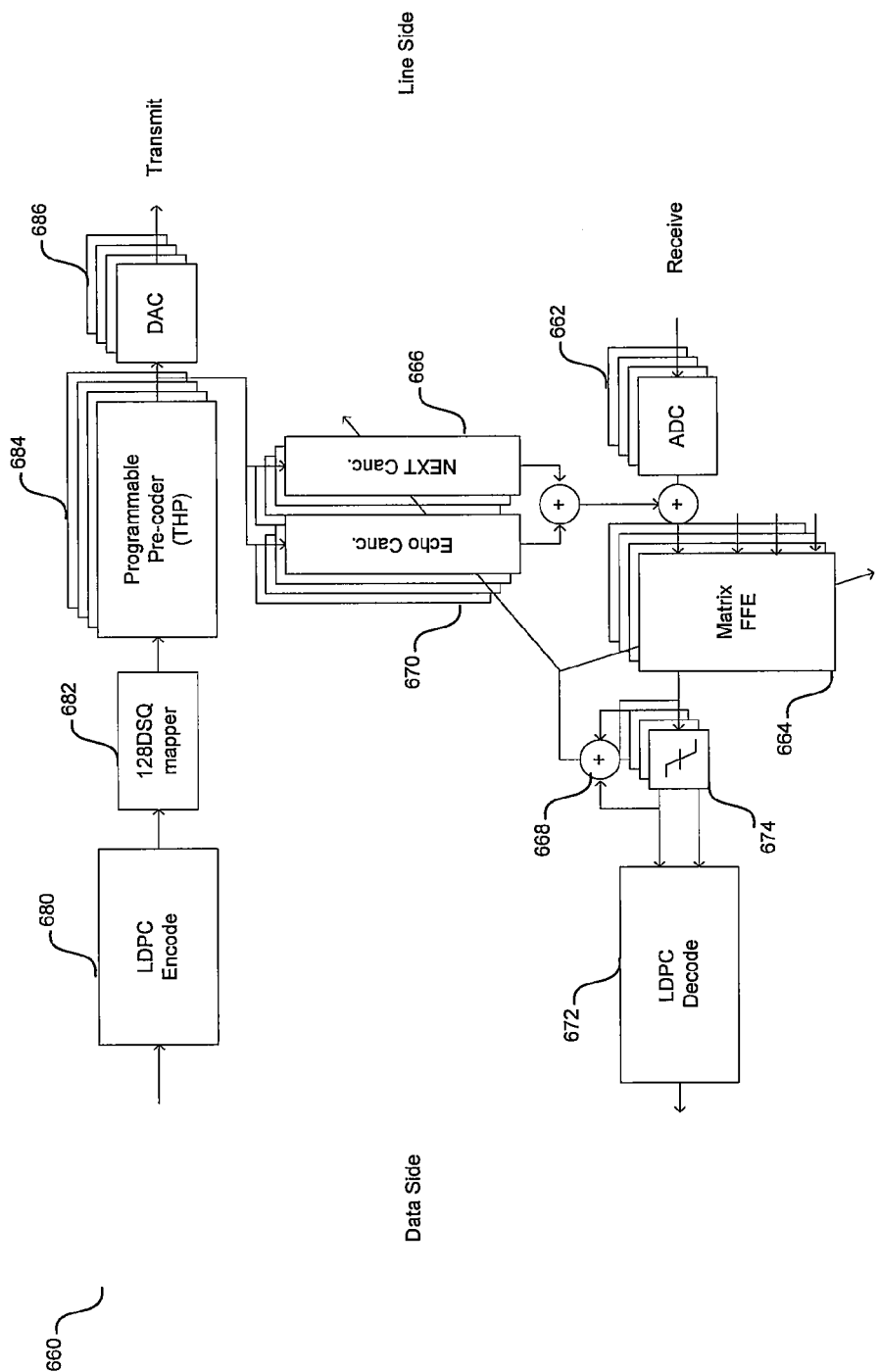

FIG. 6D is a block diagram illustrating exemplary 10 Gigabit signal processing operations for receive and transmit signals in an Ethernet system utilized for asymmetric data traffic, in accordance with an embodiment of the invention. Referring to FIG. 6D, there is shown a signal processing system 660 that may provide a portion of the signal processing performed by the physical (PHY) layer operations in an Ethernet transceiver that supports asymmetric multi-rate operation. For example, the signal processing system 660 may be implemented in the asymmetric multi-rate PHY block 412 and/or in the receivers 414b, 414d, 414f, and 414h in FIG. 4. The signal processing system 660 may comprise an analog-to-digital converter (A/D) 662, a matrix feed-forward equalizer (FFE) 664, NEXT cancellers 666, an adder 668, an ECHO canceller 670, a low density parity check code (LDPC) decoder 672, an adaptive pre-filter 674, an LDPC encoder 680, a 128 Double Square (DSQ) mapper 682, a Tomlinson Harashima precoder (THP) 684 and a digital to analog converter 686.

The A/D 662 may comprise suitable logic, circuitry, and/or code that may enable converting analog signals received via a twisted-pair wire into digital signals. The output of the A/D 662 may be communicated to the matrix FFE 664. The matrix FFE 664 may comprise suitable logic, circuitry, and/or code that may enable removal of precursor ISI to make the channel minimum-phase and to whiten the noise in the channel. The NEXT cancellers 666 may comprise suitable logic, circuitry, and/or code that may enable canceling at least a portion of the NEXT component received in the twisted-pair wire from the local transmitters corresponding to the three adjacent twisted-pair wires. The ECHO canceller 670 may comprise suitable logic, circuitry, and/or code that may enable canceling at least a portion of the ECHO component received in the twisted-pair wire from the local transmitter on the same twisted-pair wire.

The adder 668 may comprise suitable logic, circuitry, and/or code that may enable adding the output of the matrix FFE 664, the NEXT cancellers 666, and/or the ECHO canceller 670 to generate a post-cursor channel impulse response, $z_{n,1}$. The adaptive pre-filter 674 and the LDPC decoder 672 may comprise suitable logic, circuitry and/or code that may enable mitigating the ISI that may result from the post-cursor impulse response and, decoding low density parity check coded data. The adaptive prefilter 674 and LDPC decoder 672 may receive as inputs the post-cursor channel impulse responses, $z_{n,2}$, $z_{n,3}$, and $z_{n,4}$ corresponding to the other twisted-pair wires. The LDPC decoder 672 may generate the detected bits that correspond to the received analog signal.

Prior to an Ethernet transmission, the low density parity check code (LDPC) encoder 680 may comprise suitable logic, circuitry and/or code for enabling error correction. The output of the LDPC encoder 680 may be sent to the 128 DSQ mapper 682. The 128 DSQ mapper 682 may be utilized in the implementation of 16 level pulse amplitude modulation 16 (PAM16) for each twisted-pair wire. The output of the 128 DSQ mapper 682 may be sent to the THP 684. The THP 684 may comprise four THPs, one for each twisted pair. The THP 684 may comprise suitable logic, circuitry and or code that may enable spectral shaping in the transmitter and thus reduce receiver complexity. The output of the THP 684 may be communicated to the DAC 686. The DAC 686 may comprise suitable logic, circuitry and/or code that may enable converting signals from digital to analog for transmission via a twisted-pair wire cabling. The invention is not limited with regard to any specific signal processing operations or functionality. Accordingly, any suitable signal processing methods and/or system may be utilized.

Figure 7:
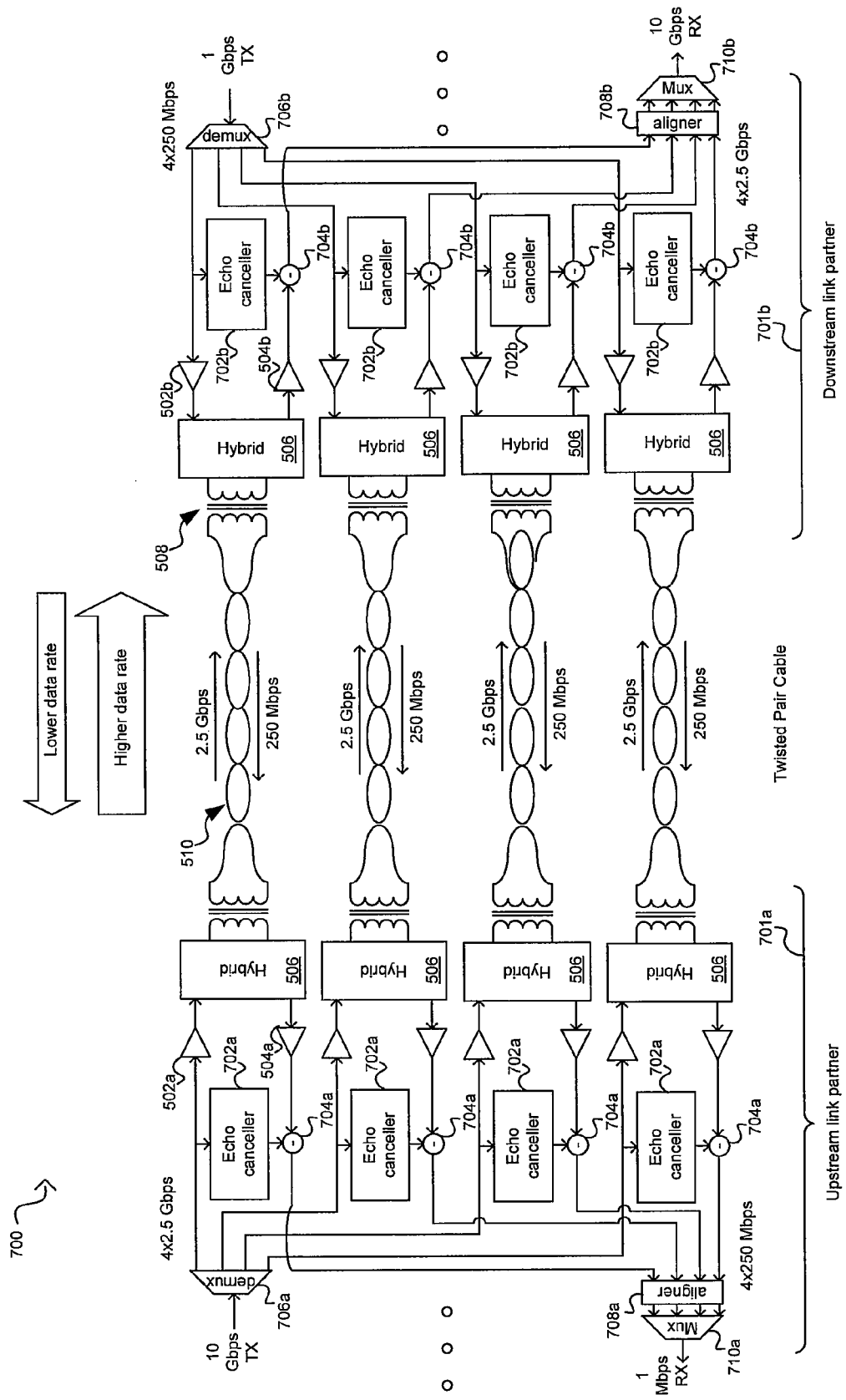
FIG. 7 is a block diagram of a multi-rate Ethernet system for asymmetric data traffic that utilizes 10 Gigabit signal processing resources in a four-pair extended range mode, in accordance with an embodiment of the invention.

FIG. 7 is a block diagram of a multi-rate Ethernet system for asymmetric data traffic that utilizes 10 Gigabit signal processing resources in a four-pair extended range mode, in accordance with an embodiment of the invention. Referring to FIG. 7, there is shown an asymmetric multi-rate Ethernet system 700 that may comprise an upstream link partner 701a and a downstream link partner 701b. The upstream link partner 701a may correspond to, for example, the entry DVD player in FIG. 1, while the downstream link partner 701b may correspond to, for example, the high definition video display panel 112. The asymmetric multi-rate Ethernet system 700 may support a plurality of asymmetric data rates or modes of operation over four-pair twisted-pair wire, including the ability to provide 1 Gbps or 10 Gbps, for example as shown in FIG. 7. In another embodiment of the invention, the asymmetric multi-rate Ethernet system 700 may operate in an extended range mode of operation that provides 10 Mbps in the downstream direction and 2 Mbps in the upstream direction, for example. In this regard, the extended range operation may be achieved by utilizing the 2 Mbps and 10 Mbps lower communication data rates, that is, data rates below the 1 Gbps or 10 Gbps that may be achieved by the signal processing operations enabled in either the upstream link partner 701a or the downstream link partner 701b.

The upstream link partner 701a may comprise four hybrids 506 as described in FIG. 5. Notwithstanding, the invention is not so limited and may support various implementations of a hybrid circuitry. Each hybrid 506 in the upstream link partner 701a may be communicatively coupled to a transmitter 502a, a receiver 504a, and to one of the four twisted-pair wires 510 also as described in FIG. 5. Associated with each hybrid 506 in the upstream link partner 701a may also be an echo canceller 702a and a subtractor 704a. The upstream link partner 701a may also comprise a demultiplexer (demux) 706a, an aligner 708a, and a multiplexer (mux) 710a.

Similarly, the downstream link partner 701b may comprise four hybrids 506. Each hybrid 506 in the downstream link partner 701b may be communicatively coupled to a transmitter 502b, a receiver 504b, and to one of the four twisted-pair wires 510 as described in FIG. 5. Associated with each hybrid 506 in the downstream link partner 701b are also an echo canceller 504b and a subtractor 506b. The remote link partner 701b may also comprise a demux 706b, an aligner 708b, and a mux 710b. The portions of the upstream link partner 701a and downstream link partner 701b shown in FIG. 7 may correspond to a portion of the physical (PHY) layer operations supported by the upstream link partner 701a and downstream link partner 701b respectively.

The demux 706a may comprise suitable logic, circuitry, and/or code that may enable separating an exemplary 10 Gbps downstream signal into four 2.5 Gbps signals for transmission over the four twisted-pair wires. Similarly, the demux 706b may comprise suitable logic, circuitry, and/or code that may enable separating an exemplary 1 Gbps upstream signal into four 250 Mbps signals for transmission over the four twisted-pair wires. The aligner 708a may comprise suitable logic, circuitry, and/or code that may enable aligning the 250 Mbps signals received from each of the four twisted-pair wires by the upstream link partner 701a. Similarly, the aligner 708b may comprise suitable logic, circuitry, and/or code that may enable aligning the 2.5 Gbps signals received from each of the four twisted-pair wires by the downstream link partner 701b. The mux 710a may comprise suitable logic, circuitry, and/or code that may enable combining the aligned 250 Mbps signals from the aligner 708a to generate the received 1 Gbps upstream signal. Similarly, the mux 710b may comprise suitable logic, circuitry, and/or code that may enable combining the aligned 2.5 Gbps signals from the aligner 708a to generate the received 10 Gbps downstream signal.

The echo cancellers 702a and 702b may comprise suitable logic, circuitry, and/or code that may enable at least partial cancellation of the ECHO component in the corresponding signal received via the receivers 504a and 504b, respectively, associated with the same twisted-pair wire. The subtractors 704a and 704b may comprise suitable logic, circuitry, and/or code that may enable cancellation of the ECHO component from the received signal.

In operation, the upstream link partner 701a may separate a 10 Gbps signal to be transmitted into four 2.5 Gbps signals via the demux 706a. Each signal to be transmitted is processed by a transmitter 502a before being communicated to the corresponding twisted-pair wire via a hybrid 506. The four transmitted signals may arrive at the downstream link partner 701b, where each of the signals may be processed by a receiver 504b before echo cancellation occurs from the operation of a corresponding echo canceller 702b and subtractor 704b. The four received 2.5 Gbps signals may be aligned in the aligner 708b before being combined in the mux 710b into a 10 Gbps received downstream signal.

Similarly, the downstream link partner 701b may separate a 1 Gbps signal to be transmitted into four 250 Mbps signals via the demux 706b. Each signal to be transmitted may be processed by a transmitter 502b before being communicated to the corresponding twisted-pair wire via a hybrid 506. The four transmitted signals may arrive at the upstream link partner 701a, where each of the signals may be processed by a receiver 504a before echo cancellation occurs from the operation of a corresponding echo canceller 702a and subtractor 704a. The four received 500 kbps signals may be aligned in the aligner 708a before being combined in the mux 710a into a 1 Gbps received upstream signal.

The upstream link partner 701a and the downstream link partner 701b may communicate via all four twisted-pair wires 510 in full duplex operation to provide an aggregate of 1 Gbps for the upstream data rate and 10 Gbps for the downstream data rate. Reducing the communication rate to 2 Mbps and 10 Mbps from, for example, 100 Mbps or higher, while utilizing the higher communication rate PHY layer signal processing operations, may enable extending the range, that is, extending the standard length, of the twisted-pair wires 510. In this regard, the asymmetric multi-rate operations of the upstream link partner 701a and a downstream link partner 701b may support Gigabit PHY layer operations that may utilize multi-level signaling to transmit multiple bits per clock interval. PAM-5 may be used to transmit 2 bits per symbol and reduce the symbol rate to carry on each twisted-pair wire 510. In this regard, multi-level signaling may be applied at 100 Mbps, 10 Mbps, or <10 Mbps rates, that is, at lower communication rates, to permit operation at reduced symbol rates. For example, 25 Mbps may be carried on a single twisted-pair wire at a 12.5 Msps symbol rate. Reducing the symbol rate enables transmission over longer cable ranges. The signal processing operations available in a Gigabit PHY layer may support 2, 3, 4, or 5 levels of signaling with no increase in complexity, for example.

Reducing the communication rate may also enable utilizing cabling with higher insertion loss while maintaining the same standard length. For example, for Gigabit operations, a Category 5 or Category 5e cable may be utilized. Reducing the communication rate in one direction in the asymmetric data traffic to 100 Mbps, for example, may enable utilizing cabling with higher insertion loss than a Category 5 or Category 5e cabling while maintaining the 100 m length requirement under the IEEE 802.3 standard. The insertion loss of a twisted-pair wire cable increases as the square root of frequency. Insertion loss, in dB, is directly proportional to cable length. Applying Gigabit signal processing operation at 100 Mbps data rate may increase the cable range. NEXT cancellation operations also improve the SNR of each received signal and may be applied at 100 Mbps and 10 Mbps rates to achieve similar improvements in SNR and further extend the cable range at those reduced communication rates.

The asymmetric multi-rate Ethernet system 700 need not be limited to achieving a lower communication rate in any one direction by evenly distributing the data rate over each of the four twisted-pair wires utilized. In another embodiment of the invention, the asymmetric multi-rate Ethernet system 700 may achieve a lower communication rate by distributing the data rate unevenly over each of the four twisted-pair wires utilized. For example, for a 10 Mbps downstream data rate, the first twisted-pair wire may support 1 Mbps, the second twisted-pair wire may support 2 Mbps, the third twisted-pair wire may support 3 Mbps, and the fourth twisted-pair wire may support 4 Mbps, to achieve an aggregate of 10 Mbps. A similar approach may be followed for generating an aggregate upstream data rate from unevenly distributed data rates over each of the four twisted-pair wires utilized. In this regard, the components in the upstream link partner 701*a* and/or the downstream link partner 701*b* may be adapted to handle an unevenly distributed lower communication rate.

Figure 8:
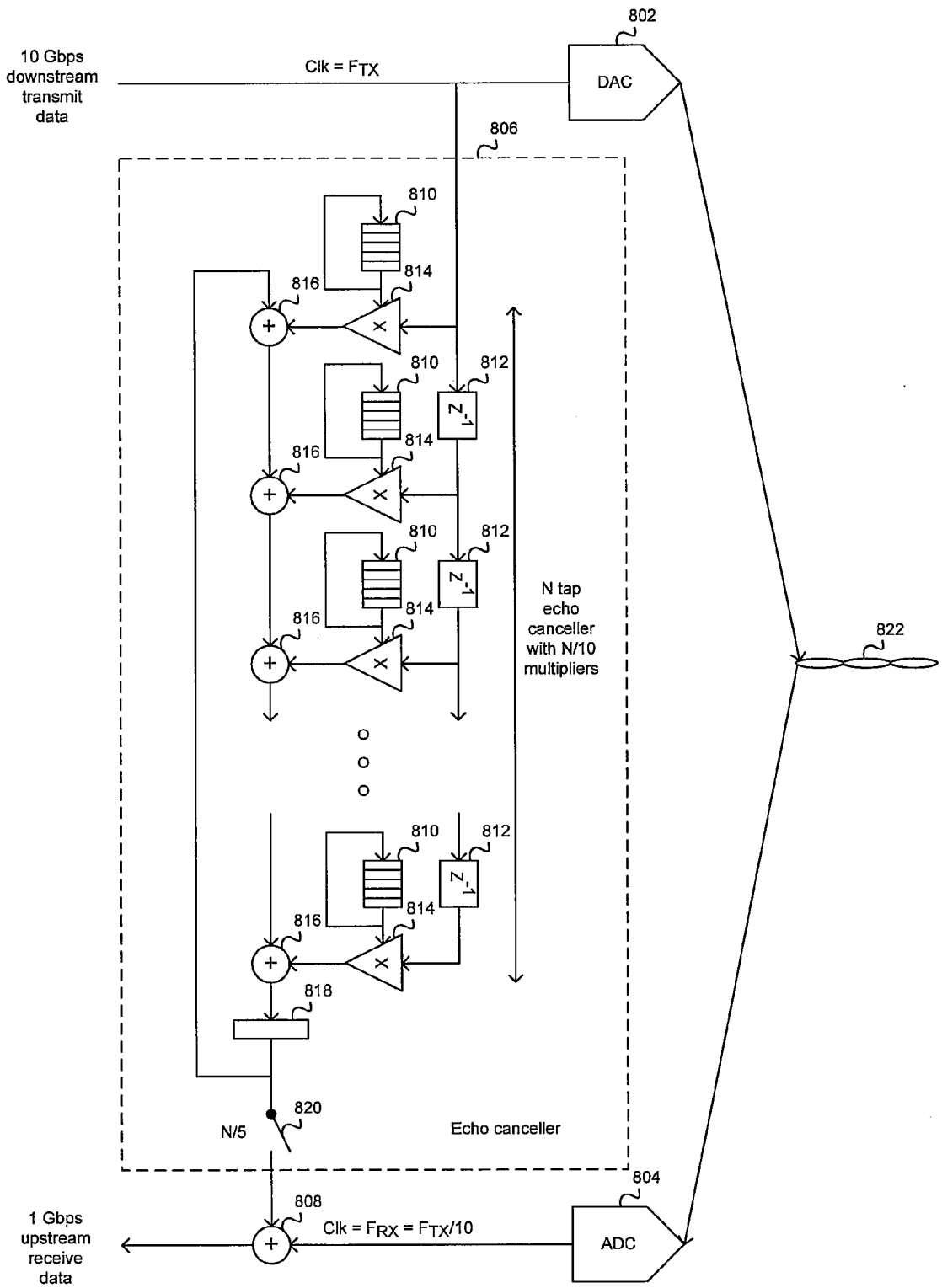
FIG. 8 is a block diagram of an exemplary echo canceller in an upstream asymmetric multi-rate PHY with a 10 Gbps downstream data rate and a 1 Mbps upstream data rate, in connection with an embodiment of the invention.

FIG. 8 is a block diagram of an exemplary echo canceller in an upstream asymmetric multi-rate PHY with a higher downstream data rate and a lower upstream data rate, in connection with an embodiment of the invention. Referring to FIG. 8, there is shown an echo canceller 806 in a portion of an asymmetric multi-rate transceiver in an upstream link partner that is utilized in a mode of operation that supports 10 Gbps downstream data rate and 1 Mbps upstream data rate. The echo canceller 806 may be implemented utilizing an N tap echo canceller architecture that utilizes N/10 multipliers, for example. In this regard, the echo canceller 806 may utilize a plurality of registers 810, a plurality of multipliers 814, a plurality of delay taps 812, a plurality of adders 816, an output register 818, and a switch 820.

The echo canceller 806 may utilize a digital downstream signal that is based on a transmission clock, $F_{TX}$, to generate an output signal via the switch 820 to be communicated to an adder 808, where the output signal is based on a receive clock, $F_{Rx}=F_{TX}/10$. The digital downstream signal may be converted to an analog downstream signal by the digital-to-analog converter (DAC) 802 for transmission via a twisted-pair copper wire 822. An analog upstream signal may be received by an analog-to-digital converter (ADC) 804 for conversion to a digital upstream signal in the upstream link partner. The digital upstream signal and the output signal generated by the echo canceller 806 may be added in the adder 808 to reduce the ECHO component in the received digital upstream signal.

Figure 9:
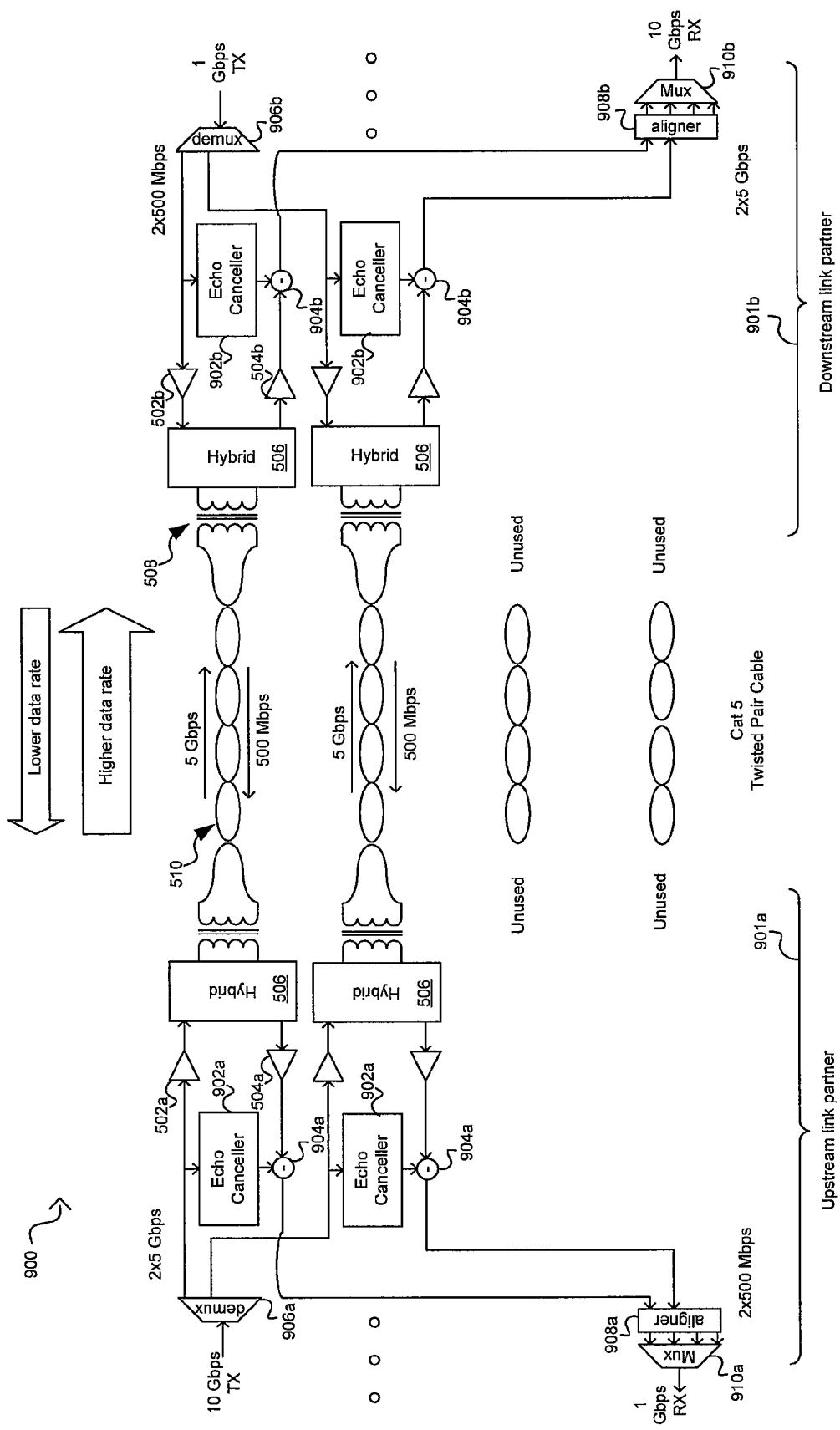
FIG. 9 is a block diagram of a multi-rate Ethernet system for asymmetric data traffic that utilizes 10 Gigabit signal processing resources in an asymmetric mode over fewer than 4 twisted pairs of wires, in accordance with an embodiment of the invention.

FIG. 9 is a block diagram of a multi-rate Ethernet system for asymmetric data traffic that utilizes Gigabit signal processing resources in a two-pair extended range mode, in accordance with an embodiment of the invention. Referring to FIG. 9, there is shown an asymmetric multi-rate Ethernet system 900 that may comprise an upstream link partner 901*a* and a downstream link partner 901*b*. The asymmetric multi-rate Ethernet system 900 may support a communication rate, for example, 10 Gbps downstream and 1 Gbps upstream. The asymmetric multi-rate Ethernet system 900 may also support other modes of operation, such as a lower asymmetric transmission rate over two-pair twisted-pair wire. In this regard, the asymmetric multi-rate Ethernet system 900 may support a lower communication rate, such as 10 Mbps downstream data rate and 2 Mbps upstream data rate, while utilizing the signal processing operations available in the asymmetric multi-rate PHY layer for processing the higher communication rate, such as 1 Gbps or 10 Gbps when available.

The upstream link partner 901*a* and the downstream link partner 901*b* may communicate, for example, via two Category 5 twisted-pair wires 510 in full duplex operation. A 5 Gbps downstream data rate at each wire may provide an aggregate downstream data rate of 10 Gbps and a 500 Mbps upstream data rate at each wire may provide an aggregate upstream data rate of 1 Gbps. The upstream link partner 901*a* may utilize two hybrids 506 with corresponding echo canceller 902*a* and a subtractor 904*a*. The upstream link partner 901*a* may also utilize a demux 906*a*, an aligner 908*a*, and a mux 910*a* for transmission and reception of signals at the reduced asymmetric communication rate. Similarly, the downstream link partner 901*b* may utilize two hybrids 506 with corresponding echo canceller 902*b* and a subtractor 904*b*. The downstream link partner 901*b* may also utilize a demux 906*b*, an aligner 908*b*, and a mux 910*b* for transmission and reception of signals at the reduced asymmetric communication rate. The two remaining twisted-pair wires may remain unused in the asymmetric multi-rate Ethernet system 900.

The asymmetric multi-rate Ethernet system 900 need not be limited to achieving a lower asymmetric communication rate by evenly distributing the data rate over each of the two twisted-pair wires utilized. In another embodiment of the invention, the asymmetric multi-rate Ethernet system 800 may achieve a lower communication rate by distributing the upstream and downstream data rates unevenly over each of the two twisted-pair wires utilized. For example, the first twisted-pair wire may support a 4 Gbps downstream data rate while the second twisted-pair wire may support 6 Gbps downstream data rate, to achieve an aggregate of 10 Gbps. Similarly, the first twisted-pair wire may support a 800 Mbps upstream data rate while the second twisted-pair wire may support 200 Mbps upstream data rate, to achieve an aggregate of 1 Gbps In this regard, the components in the upstream link partner 901*a* and/or the downstream link partner 901*b* may be adapted to handle an unevenly distributed lower communication rate with asymmetric data traffic.

Figure 10:
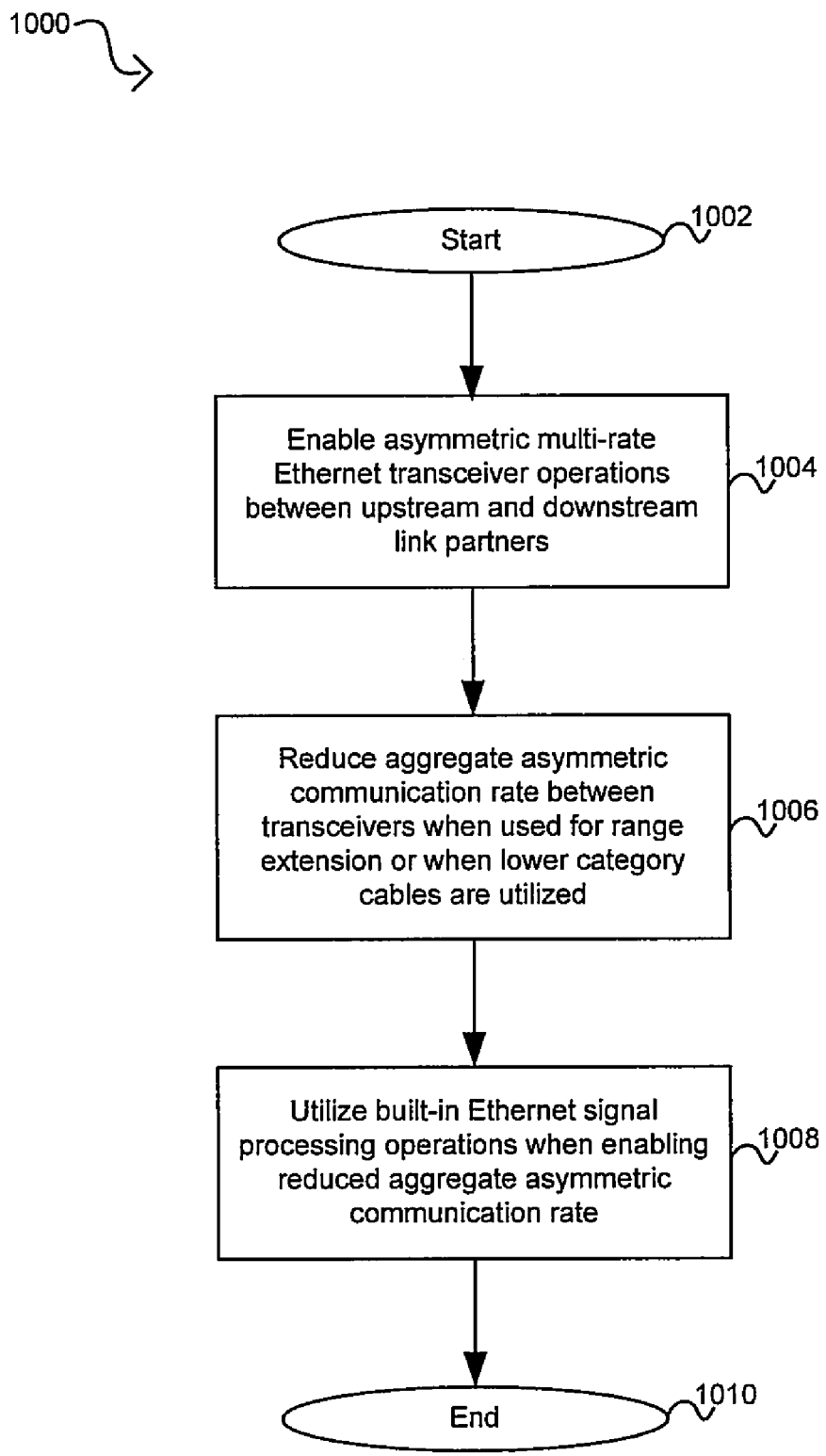
FIG. 10 is a flow diagram illustrating exemplary steps in communication rate reduction in Ethernet systems that utilize asymmetric multi-rate PHYs, in accordance with an embodiment of the invention.

FIG. 10 is a flow diagram illustrating exemplary steps in communication rate reduction to achieve extended range in Ethernet systems that utilize asymmetric multi-rate PHYs, in accordance with an embodiment of the invention. Referring to FIG. 10, there is shown a flow diagram 1000. After start step 1002, in step 1004, an asymmetric Gigabit Ethernet transceiver may be enabled. The Gigabit Ethernet transceiver may utilize an asymmetric multi-rate PHY layer that enables reducing the communication rate from, for example, 1 Gbps to a lower communication rate. The lower communication rate may be a 10 Mbps downstream data rate and a 2 Mbps upstream data rate, for example, but need not be so limited. The asymmetric multi-rate PHY layer may also enable reduction of the symbol rate for the asymmetric Gigabit Ethernet transceiver. When reducing the communication rate or symbol rate, the asymmetric multi-rate PHY layer enables the application of Gigabit signal processing operations to the reduced communication or symbol rate.

In step 1006, an extended range mode may be enabled in the asymmetric Gigabit Ethernet transceiver whereby the asymmetric multi-rate PHY layer reduces the communication rate and/or the symbol rate in at least one of the communication directions. In step 1008, at least a portion of the asymmetric Gigabit signal processing operations available in the asymmetric multi-rate PHY layer may be utilized during the extended range mode to enable the use of longer cables or to enable the use of higher insertion loss cables at the standard length. After step 1008, the process may proceed to end step 1010.

In an embodiment of the invention, signals are communicated between an upstream link partner device 122 and a downstream link partner device 126, wherein each of the link partner devices 122 and 126 comprise an asymmetric multi-rate Ethernet physical layer (PHY) to handle the communication. Moreover, communications between the link partners 122 and 126 are handled via A/V Bridging services with quality of service descriptors. The signals transmitted from the upstream link partner 122 to the downstream link partner 126 may comprise high bandwidth audio/video (A/V) signals. Low bandwidth signals may be transmitted from the downstream link partner 126 to the upstream link partner 122. Protocol data units (PDUs) may be generated comprising one or more of a time stamp value, a traffic class designation and/or a destination address.

Prior to communicating PDUs via an asymmetrical multi-rate Ethernet PHY between the upstream link partner 122 and the downstream link partner 126, a data rate request and a reservation message for resources may be generated based on one or more of a said time stamp value, a traffic class designation and/or a destination address. Furthermore, an upstream link partner 122 or downstream link partner 126 may register for the deliver of the PDUs via the asymmetric multi-rate Ethernet PHY. The communication rate of signals may be reduced prior to distribution of the signals among one or more links coupling the upstream link partner 122 and the downstream link partner 126. In this regard, the aggregate communication rate may be distributed evenly or unevenly among the one or more links coupling the upstream link partner 122 and the downstream link partner 126 via the asymmetrical multi-rate Ethernet PHY. The distributed communication rate received from the upstream link partner 122 or the down stream link partner 126 may be aggregated via the asymmetric multi-rate PHY. The asymmetric multi-rate Ethernet PHY may handle compressed and/or uncompressed video signals as well as encrypted o unencrypted video signals. Moreover, the communication signals may be modified and/or processed by at least one of an echo cancellation operation, a near end cross talk (NEXT) cancellation operation, a far end cross talk (FEXT) cancellation operation and/or forward error checking (FEC) and equalization.

Another embodiment of the invention may provide a machine-readable storage, having stored thereon, a computer program having at least one code section executable by a machine, thereby causing the machine to perform the steps as described herein for enabling communicating data via asymmetric physical layer operation for Ethernet A/V Bridging and Ethernet A/V Bridging extensions.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
in a first link partner device:
communicating signals to a corresponding second link partner device and/or receiving signals from said corresponding second link partner device, wherein:
each of said first link partner device and said corresponding second link partner device comprise an asymmetric multi-rate Ethernet physical layer (PHY) transceiver that handles said communication of said signals;
said communication to said corresponding second link partner device and/or said signals received from said corresponding second link partner device are handled via A/V Bridging services with quality of service descriptors; and wherein
said first link partner device is operable to utilize a plurality of different rates for said communicating of signals to said corresponding second link partner device and/or for said receiving of signals from said corresponding second link partner device.

2. The method according to claim 1, comprising communicating high bandwidth audio/video (A/V) signals to said corresponding second link partner device.

3. The method according to claim 1, comprising receiving low bandwidth signals from said corresponding second link partner device.

4. The method according to claim 1, comprising one or both of:
generating at least one protocol data unit (PDU) comprising one or more of a time stamp value, a traffic class designation and/or a destination address for said communicating of signals to said corresponding second link partner device; and
receiving at least one PDU comprising one or more of a time stamp value, a traffic class designation and a destination address for said receiving of signals from said corresponding second link partner device;
via said asymmetric multi-rate Ethernet PHY transceiver.

5. The method according to claim 4, comprising requesting a data rate for one or both of:
communicating said at least one PDU to said corresponding second link partner device;
receiving said at least one PDU from said corresponding second link partner device;
via said asymmetric multi-rate Ethernet PHY transceiver.

6. The method according to claim 4, comprising generating a reservation message for, one or both of:
transmitting said at least one PDU to said corresponding second link partner device; and
receiving at least one PDU from said corresponding second link partner device;
via said asymmetric multi-rate Ethernet PHY transceiver based on one or more of said time stamp value, said traffic class designation and/or said destination address.

7. The method according to claim 4, comprising generating a registration message for one or both of:
delivery of said at least one PDU to said corresponding second link partner device; and
receiving said at least one PDU from said corresponding second said link partner device;
via said asymmetric multi-rate Ethernet PHY transceiver.

8. The method according to claim 1, comprising reducing a communication rate of said signals for distribution of said signals among one or more links coupling said first link partner device to said second link partner device, for said communicating signals to said corresponding second link partner device and/or said receiving signals from said corresponding second link partner device, via said asymmetric multi-rate Ethernet PHY transceiver.

9. The method according to claim 1, comprising distributing an aggregate communication rate evenly or unevenly among one or more links coupling said first link partner device to said second link partner device, for said communicating signals to said corresponding second link partner device and/or for said receiving signals from said corresponding second link partner device, via said asymmetric multi-rate Ethernet PHY transceiver.

10. The method according to claim 9, comprising aggregating said distributed communication rate from said one or more links coupling said first link partner device to said second link partner device, for said communicating signals to said corresponding second link partner device and/or for said receiving signals from said corresponding second link partner device, via said asymmetric multi-rate Ethernet PHY transceiver.

11. The method according to claim 1, wherein said asymmetric multi-rate Ethernet PHY transceiver handles compressed and/or uncompressed video signals.

12. The method according to claim 1, wherein said asymmetric multi-rate Ethernet PHY transceiver handles encrypted and/or unencrypted video signals.

13. The method according to claim 1, comprising modifying one or more of said communicated signals and/or said received signals via at least one of an echo cancellation operation, a near end cross talk (NEXT) cancellation operation, forward error checking (FEC) and a far end cross talk (FEXT) cancellation operation.

14. The method according to claim 1, comprising equalizing video signals communicated to said second link partner device.

15. A system for communicating data, the system comprising:
one or more circuits for use within a first link partner device, said one or more circuits are operable to:
communicate signals to a corresponding second link partner device and/or receive signals from said corresponding second link partner device, wherein:
each of said first link partner device and said corresponding second link partner device comprise an asymmetric multi-rate Ethernet physical layer (PHY) transceiver that handles said communication of said signals;
said communication to said corresponding second link partner device and/or said signals received from said corresponding second link partner device, are handled via A/V Bridging services with quality of service descriptors; and wherein
said first link partner device is operable to utilize a plurality of different rates for said communicating of signals to said corresponding second link partner device and/or for said receiving of signals from said corresponding second link partner device.

16. The system according to claim 15, wherein said one or more circuits is operable to communicate high bandwidth audio/video (A/V) signals to said corresponding second link partner device.

17. The system according to claim 15, wherein said one or more circuits is operable to receive low bandwidth signals from said corresponding second link partner device.

18. The system according to claim 15, wherein said one or more circuits is operable to, one or both of:

generate at least one protocol data unit (PDU) comprising one or more of a time stamp value, a traffic class designation and/or a destination address for said communication of signals to said corresponding second link partner device; and
receiving at least one PDU comprising one or more of a time stamp value, a traffic class designation and a destination address for said reception of signals from said corresponding second link partner device;
via said asymmetric multi-rate Ethernet PHY transceiver.

19. The system according to claim 18, wherein said one or more circuits is operable to request a data rate for one or both of:
communicating said at least one PDU to said corresponding second link partner device;
receiving said at least one PDU from said corresponding second link partner device;
via said asymmetric multi-rate Ethernet PHY transceiver.

20. The system according to claim 18, wherein said one or more circuits is operable to generate of a reservation message for, one or both of:
transmitting said at least one PDU to said corresponding second link partner device; and
receiving at least one PDU from said corresponding second link partner device;
via said asymmetric multi-rate Ethernet PHY transceiver based on one or more of said time stamp value, said traffic class designation and/or said destination address.

21. The system according to claim 18, wherein said one or more circuits is operable to generate a registration message for one or both of:
delivery of said at least one PDU to said corresponding second link partner device; and
receiving said at least one PDU from said corresponding second link partner device;
via said asymmetric multi-rate Ethernet PHY transceiver.

22. The system according to claim 15, wherein said one or more circuits is operable to reduce a communication rate of said signals for distribution of said signals among one or more links coupling said first link partner device to said second link partner device, for said communicating signals to said corresponding second link partner device and/or said receiving signals from said corresponding second link partner device, via said asymmetric multi-rate Ethernet PHY transceiver.

23. The system according to claim 15, wherein said one or more circuits is operable to distribute an aggregate communication rate evenly or unevenly among one or more links coupling said first link partner device to said second link partner device, for said communicating signals to said corresponding second link partner device and/or for said receiving signals from said corresponding second link partner device, via said asymmetric multi-rate Ethernet PHY transceiver.

24. The system according to claim 23, wherein said one or more circuits is operable to aggregate said distributed communication rate from said one or more links coupling said first link partner device to said second link partner device, for said communicating signals to said corresponding second link partner device and/or for said receiving signals from said corresponding second link partner device, via said asymmetric multi-rate Ethernet PHY transceiver.

25. The system according to claim 15, wherein said asymmetric multi-rate Ethernet PHY transceiver handles compressed and/or uncompressed video signals.

26. The system according to claim 15, wherein said asymmetric multi-rate Ethernet PHY transceiver handles encrypted and/or unencrypted video signals.

27. The system according to claim 15, wherein said one or more circuits is operable to modify one or more of said communicated signals and/or said received signals via at least one of an echo cancellation operation, a near end cross talk (NEXT) cancellation operation, forward error checking (FEC) and a far end cross talk (FEXT) cancellation operation.

28. The system according to claim 15, wherein said one or more circuits is operable to equalize video signals communicated to said second link partner device.

* * * * *

UNITED STATES PATENT AND TRADEMARK OFFICE
CERTIFICATE OF CORRECTION

PATENT NO. : 7,835,374 B2
APPLICATION NO. : 11/861037
DATED : November 16, 2010
INVENTOR(S) : Wael William Diab, Yong Kim and Scott Powell It is certified that error appears in the above-identified patent and that said Letters Patent is hereby corrected as shown below:

Column 24, line 62 (claim 7): after "corresponding second," change "said link partner" to --link partner--.
Column 26, line 20 (claim 20): after "operable to generate," change "of a reservation" to --a reservation--.

Signed and Sealed this
Ninth Day of August, 2011

David J. Kappos
*Director of the United States Patent and Trademark Office*